United States Patent
Hosseini et al.

(10) Patent No.: US 10,484,144 B2
(45) Date of Patent: Nov. 19, 2019

(54) HYBRID AUTOMATIC REPEAT REQUEST MANAGEMENT FOR LOW LATENCY COMMUNICATIONS

(71) Applicant: QUALCOMM Incorporated, San Diego, CA (US)

(72) Inventors: Seyedkianoush Hosseini, San Diego, CA (US); Wanshi Chen, San Diego, CA (US); Jing Sun, San Diego, CA (US); Shimman Patel, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/808,568

(22) Filed: Nov. 9, 2017

(65) Prior Publication Data
US 2018/0139012 A1 May 17, 2018

Related U.S. Application Data

(60) Provisional application No. 62/420,911, filed on Nov. 11, 2016.

(51) Int. Cl.
*H04L 1/18* (2006.01)
*H04L 5/00* (2006.01)
*H04W 72/12* (2009.01)
*H04L 1/08* (2006.01)

(52) U.S. Cl.
CPC .......... *H04L 1/1816* (2013.01); *H04L 1/1822* (2013.01); *H04L 1/1825* (2013.01);
(Continued)

(58) Field of Classification Search
None
See application file for complete search history.

(56) References Cited

U.S. PATENT DOCUMENTS

| 2013/0003663 A1* | 1/2013 | Blankenship ......... H04L 1/0004 370/329 |
| 2015/0103752 A1* | 4/2015 | Yu ...................... H04L 49/9005 370/329 |

(Continued)

FOREIGN PATENT DOCUMENTS

| WO | WO-2016163623 A1 * | 10/2016 | .......... H04W 72/042 |
| WO | 2017136678 A1 | 8/2017 | |

(Continued)

OTHER PUBLICATIONS

Partial International Search Report—PCT/US2017/061152—ISA/EPO—dated Feb. 19, 2018.

(Continued)

*Primary Examiner* — Chi H Pham
*Assistant Examiner* — Vladislav Y Agureyev
(74) *Attorney, Agent, or Firm* — Arent Fox LLP

(57) ABSTRACT

The present disclosure may enable a buffer to accommodate HARQ processes for transmissions with different TTIs when the UE is configured for legacy communications and ULL communications. The apparatus may allocate a first number of HARQ IDs to a first portion of a buffer, the first number of HARQ IDs being associated with a first transmission TTI HARQ process. In addition, the apparatus may allocate a second number of HARQ IDs to a second portion of the buffer. In an aspect, the second number of HARQ IDs may be associated with a second TTI HARQ process. In addition, the first portion and second portion may not change a total buffer size. The apparatus may also receive a HARQ response associated with a HARQ ID allocated to the first portion or the second portion.

22 Claims, 18 Drawing Sheets

(52) U.S. Cl.
CPC .......... *H04L 1/1835* (2013.01); *H04L 1/1887* (2013.01); *H04L 1/1893* (2013.01); *H04L 5/0044* (2013.01); *H04L 5/0055* (2013.01); *H04L 5/0082* (2013.01); *H04W 72/1289* (2013.01); *H04L 1/08* (2013.01)

(56) References Cited

U.S. PATENT DOCUMENTS

| | | | |
|---|---|---|---|
| 2016/0143030 A1* | 5/2016 | Lee | H04L 5/00 370/329 |
| 2016/0204907 A1 | 7/2016 | Chen et al. | |
| 2017/0290008 A1* | 10/2017 | Tooher | H04L 1/0007 |
| 2018/0020335 A1* | 1/2018 | Yin | H04N 21/41407 |
| 2018/0042013 A1* | 2/2018 | Byun | H04J 11/00 |
| 2018/0098337 A1* | 4/2018 | Lee | H04W 72/042 |
| 2018/0234998 A1* | 8/2018 | You | H04W 72/042 |
| 2018/0255543 A1* | 9/2018 | Takeda | H04B 1/713 |
| 2019/0021072 A1* | 1/2019 | Horiuchi | H04L 1/0003 |
| 2019/0116582 A1* | 4/2019 | Pelletier | H04W 72/048 |

FOREIGN PATENT DOCUMENTS

| | | | | |
|---|---|---|---|---|
| WO | WO-2017132978 A1 * | 8/2017 | | H04L 1/0003 |
| WO | 2017171629 A1 | 10/2017 | | |

OTHER PUBLICATIONS

International Search Report and Written Opinion—PCT/US2017/061152—ISA/EPO—dated Apr. 20, 2018.

* cited by examiner

HYBRID AUTOMATIC REPEAT REQUEST MANAGEMENT FOR LOW LATENCY COMMUNICATIONS

CROSS-REFERENCE TO RELATED APPLICATION(S)

This application claims the benefit of U.S. Provisional Application Ser. No. 62/420,911, entitled "HYBRID AUTOMATIC REPEAT REQUEST MANAGEMENT FOR LOW LATENCY COMMUNICATIONS" and filed on Nov. 11, 2016, which is expressly incorporated by reference herein in its entirety.

BACKGROUND

Field

The present disclosure relates generally to communication systems, and more particularly, to hybrid automatic repeat request (HARD) management for ultra-low latency (ULL) communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

HARQ is one mechanism that may be used by wireless communication systems to detect and correct data packets that are received with one or more error(s). Each data packet transmitted by a user equipment (UE) and/or a base station may be associated with a particular HARQ process (e.g., HARQ process identification (ID)). When the network receives an error data packet for a HARQ process, the network may buffer the data packet and request a retransmission of the data packet for that HARQ process.

There is a need to enable a UE buffer to accommodate HARQ processes for transmissions with different TTIs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

HARQ is one mechanism that may be used by wireless communication systems to detect and correct data packets that are received in error. Each data packet transmitted by a UE and/or base station may be associated with a particular HARQ process (e.g., HARQ ID). When the network receives an error data packet for a HARQ process, the network may buffer the data packet and request a retransmission of the data packet for that HARQ process. The UE may buffer information associated with a particular HARQ process in a HARQ buffer until an ACK is transmitted to the base station. The HARQ buffer may be partitioned into a plurality of subbuffers that are each associated with a particular HARQ process. For example, the HARQ buffer may be partitioned into eight subbuffers at a UE that supports eight HARQ processes (e.g., indexed 0-7). In addition, once a data packet is sent for a HARQ process, the base station may wait for the ACK and/or a negative ACK (NACK) before processing another data packet for that HARQ process. This may reduce the RTT for the data packet to be transmitted to the network and an ACK and/or NACK to be received at the base station without impacting throughput of the system.

There is a need to enable a UE buffer to accommodate HARQ processes for transmissions with different TTIs.

The present disclosure provides a solution to the problem by allocating a first number of HARQ IDs associated with a first TTI to a first portion of the HARQ buffer and a second number of HARQ IDs associated with a second TTI to a second portion of the HARQ buffer without changing a total size of the HARQ buffer.

In an aspect of the disclosure, a method, a computer-readable medium, and an apparatus are provided. The apparatus may allocate a first number of HARQ IDs to a first portion of a buffer, the first number of HARQ IDs being associated with a first transmission TTI HARQ process. In addition, the apparatus may allocate a second number of HARQ IDs to a second portion of the buffer. In an aspect, the second number of HARQ IDs may be associated with a second TTI HARQ process. In addition, the first portion and second portion may not change a total buffer size. The apparatus may also receive a HARQ response (e.g., a retransmission) associated with a HARQ ID allocated to the first portion of the buffer or the second portion of the buffer.

In another aspect, the apparatus may be configured for a TTI with shortened timing. The apparatus may also perform a calculation associated with a bundling operation. Further, the apparatus may determine timing based on the TTI with the shortened timing and the calculation associated with the bundling operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
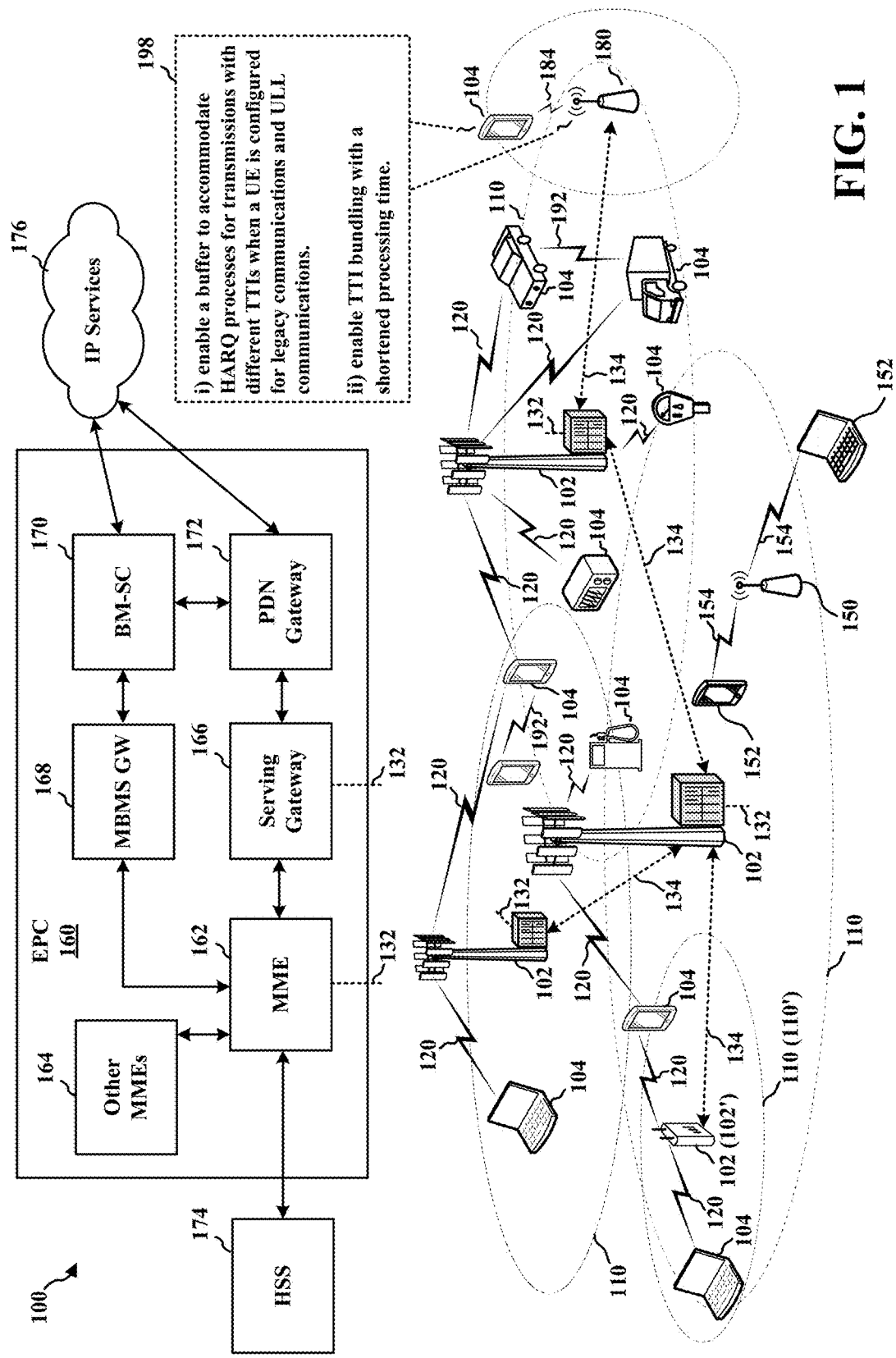
FIG. 1 is a diagram illustrating an example of a wireless communications system and an access network.
Figure 2:
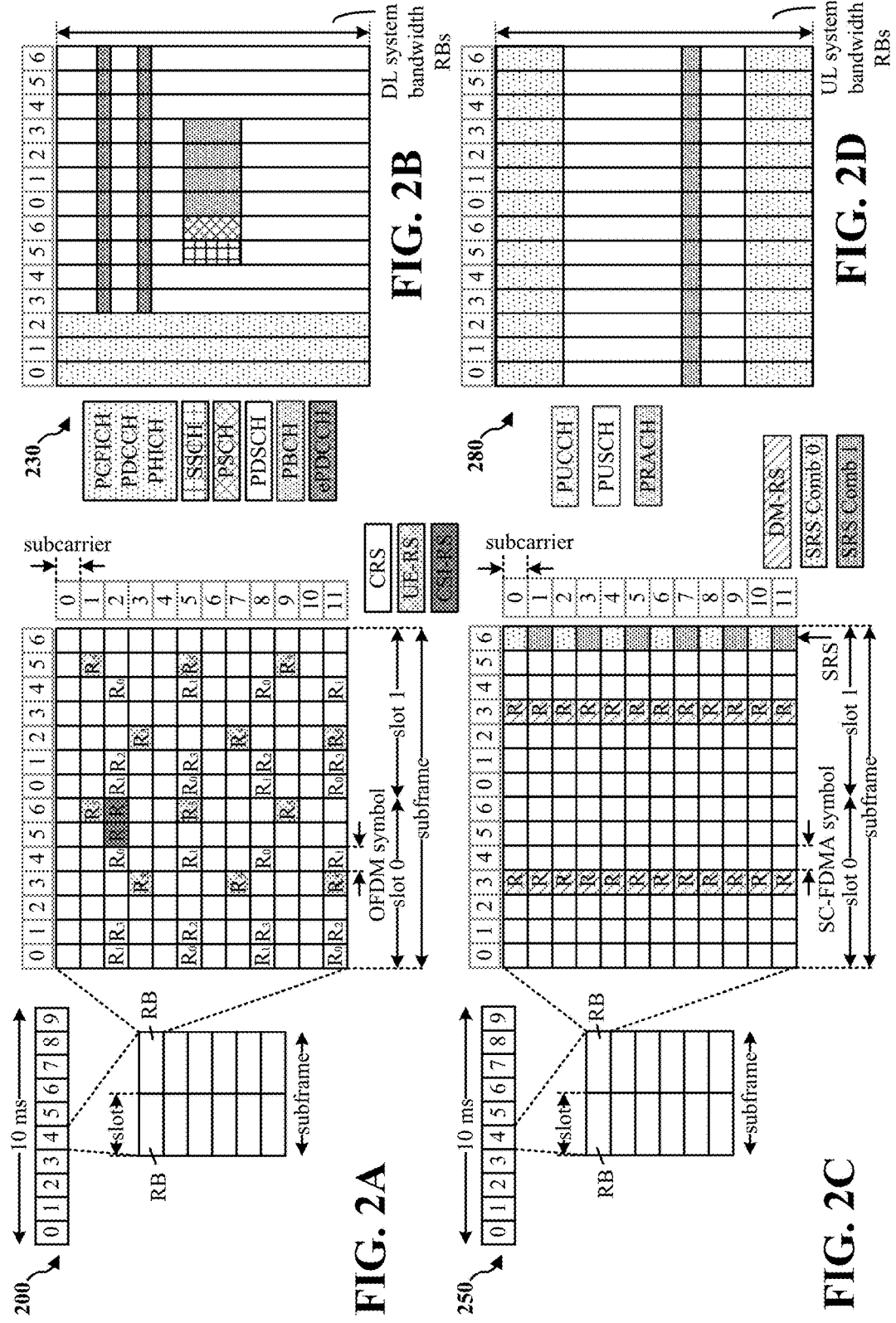
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ new radio (NR) and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to i) accommodate HARQ processes in a buffer for transmissions with different TTIs when a UE is configured for legacy communications and ULL communications, and/or ii) enable TTI bundling with a shortened processing time (198), e.g., as described below in connection with any of FIGS. 2A-14.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
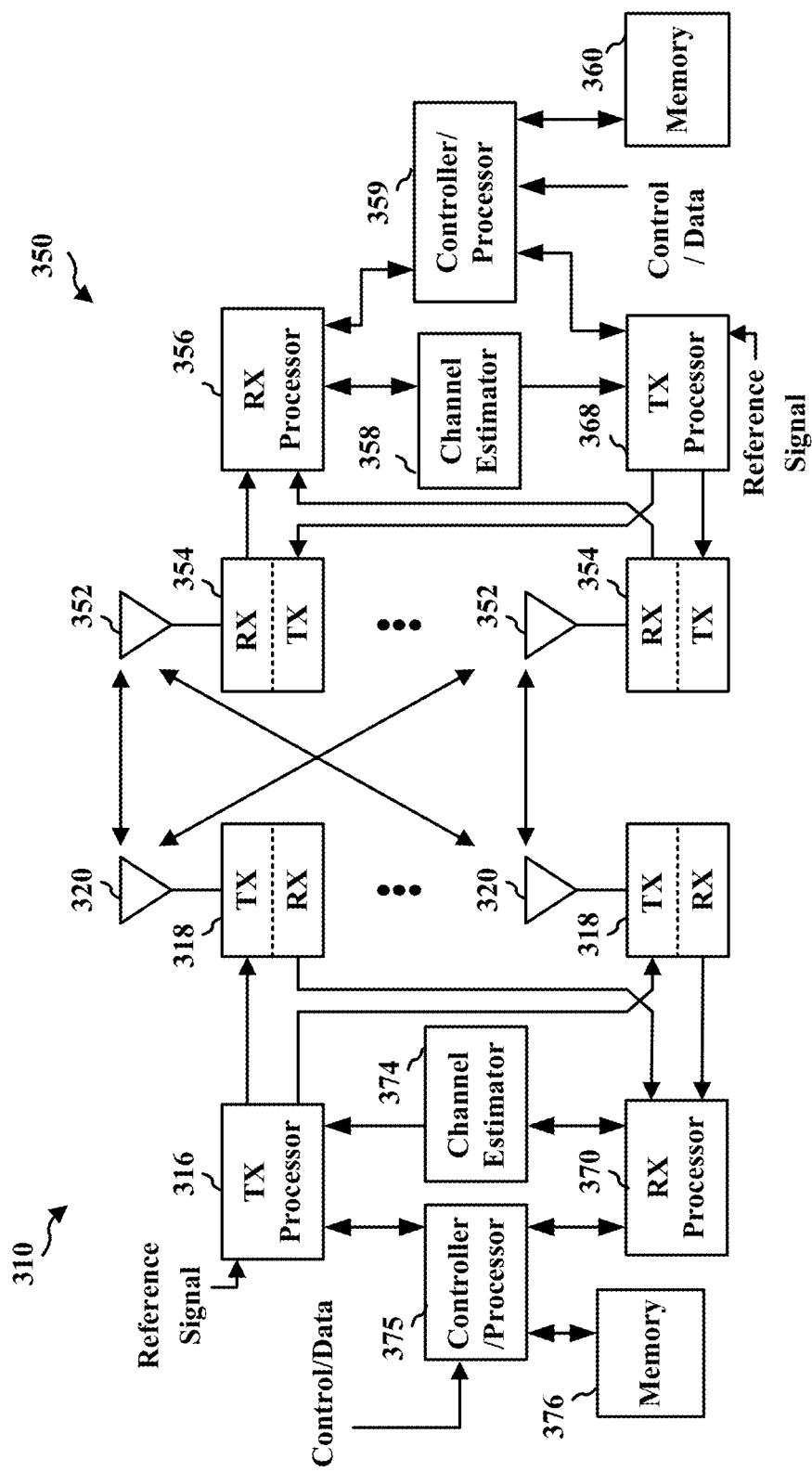
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

HARQ is one mechanism that may be used by wireless communication systems to detect and correct data packets that are received in error. Each data packet transmitted by a UE and/or base station may be associated with a particular HARQ process (e.g., HARQ ID). When the UE receives an error data packet for a HARQ process, the UE may buffer the data packet and send a NACK to the base station. The UE may buffer information associated with a particular HARQ process in a HARQ buffer until an ACK is sent to the base station. The HARQ buffer may be partitioned into a plurality of subbuffers that are each associated with a particular HARQ process. For example, the HARQ buffer may be partitioned into eight subbuffers at a UE that supports eight HARQ processes (e.g., indexed 0-7). In addition, once a data packet is sent for a HARQ process, the base station may wait for the ACK and/or a NACK before processing another data packet for that HARQ process. This may reduce the RTT for the data packet to be transmitted to the network and an ACK and/or NACK to be received at the base station and/or UE without impacting throughput of the system.

There is a need to enable a UE buffer to accommodate HARQ processes for transmissions with different TTIs.

The present disclosure provides a solution to the problem by allocating a first number of HARQ IDs associated with a first TTI HARQ process to a first portion of the buffer and a second number of HARQ IDs associated with a second TTI HARQ process to a second portion of the buffer without changing a total size of the buffer.

Figure 4:
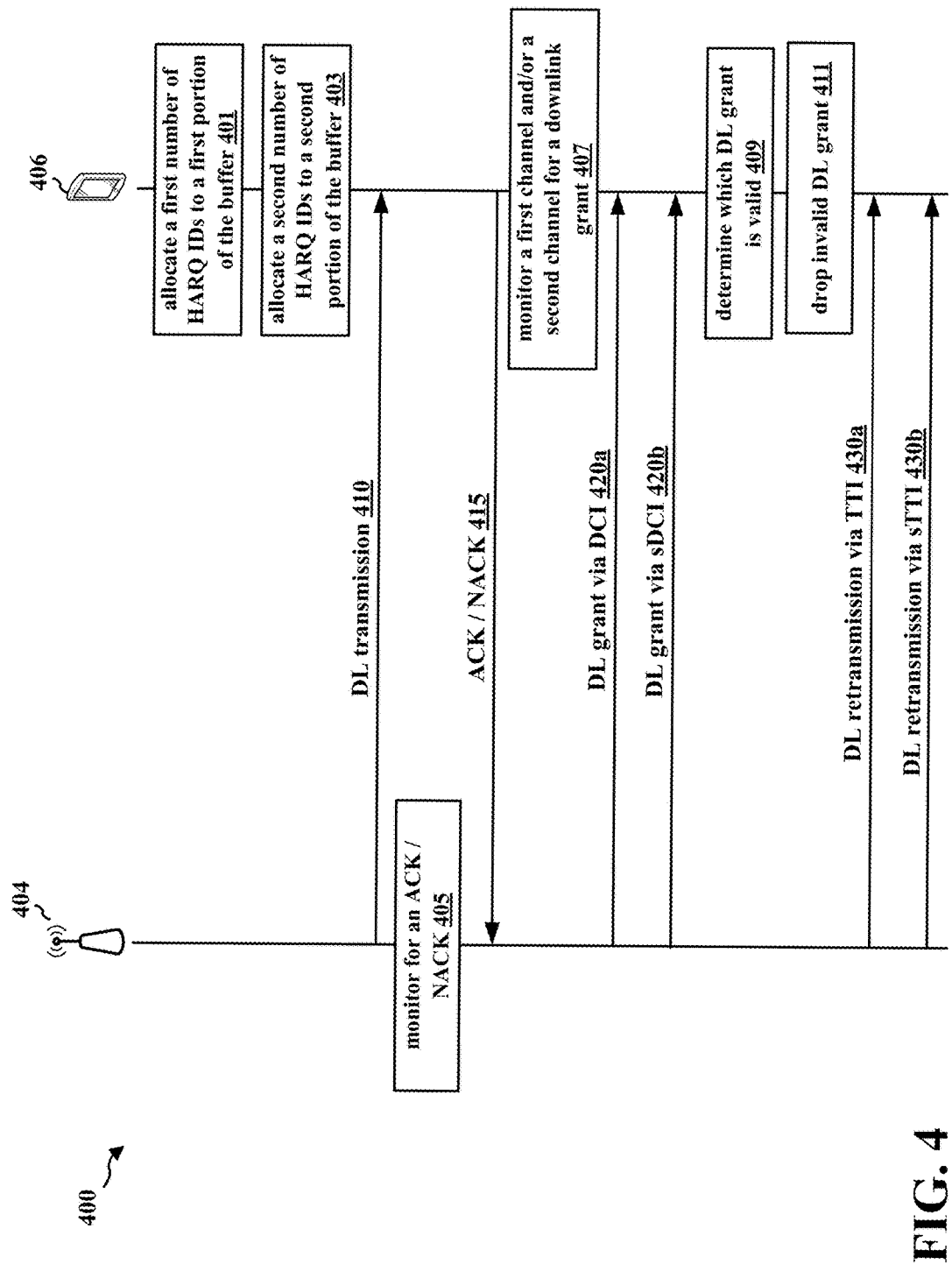
FIG. 4 illustrates a data flow that may be used to enable a buffer to accommodate HARQ processes for transmissions with different TTIs when the UE 406 is configured for legacy communications and ULL communications in accordance with certain aspects of the disclosure.

FIG. 4 illustrates a data flow 400 that may be used to enable a buffer to accommodate HARQ processes for transmissions with different TTIs when the UE 406 is configured for legacy communications and ULL communications in accordance with certain aspects of the disclosure.

The data flow 400 may be performed, for example, by a base station 404 (e.g., base station 102, 180, 804, 1050, 1350, eNB 310) and a UE 406 (e.g., 104, 806, 350, the apparatus 1002/1002', 1302/1302'). In an aspect, UE 406 may be configured to send and/or receive data transmissions using a legacy TTI and/or a ULL shortened TTI (sTTI). In another aspect, the legacy TTI may be a one millisecond TTI, and the sTTI may be a two symbol based TTI or a slot based TTI. Further, the sTTI may be shorter than the legacy TTI.

The buffer at UE 406 may store information related to HARQ processes for transmitted data packets (e.g., either downlink transmissions or uplink transmissions). In an aspect, the buffer may be partitioned into a plurality of subbuffers that are each associated with a particular HARQ process ID. For example, the UE 406 may support eight legacy HARQ processes (e.g., HARQ process IDs 0-7) and the buffer may be partitioned into eight subbuffers indexed 0-7.

In order to accommodate both legacy HARQ processes and sTTI HARQ processes at the buffer, UE 406 may allocate 401 a first number of HARQ IDs to a first portion of the buffer and allocate 403 a second number of HARQ IDs to a second portion of the buffer without changing the total buffer size. For example, the first number of HARQ IDs may be associated with legacy TTI HARQ processes and the second number of HARQ IDs may be associated with sTTI HARQ processes.

In an aspect, the UE 406 may allocate 401 the first number of HARQ IDs available for the first TTI HARQ process to a first subbuffer associated with the first TTI HARQ process. In addition, the UE 406 may allocate 403 the second number of HARQ IDs available for the second TTI HARQ process to a second subbuffer associated with the second TTI HARQ processes.

In a first example embodiment, the first portion of the buffer and the second portion of the buffer may be the same portion of the buffer (e.g., both portions make up the entire buffer). For example, each of the HARQ IDs associated with the legacy TTI HARQ processes may be shared with the sTTI HARQ processes. Additional details associated with a buffer used by UE 406 in the first example embodiment are discussed supra with respect to FIG. 5.

In a second example embodiment, the first number of HARQ IDs associated with the legacy TTI HARQ processes may not be shared with the second number of HARQ IDs associated with the sTTI HARQ processes. Additional details associated with a buffer used by UE 406 in accordance with the second example embodiment are discussed supra with respect to FIGS. 6A, 6B, and 6C.

In a third example embodiment, a certain amount of the first number of HARQ IDs and the second number of HARQ IDs may be shared between the legacy TTI HARQ processes and the sTTI HARQ processes. Additional details associated with a buffer used by UE 406 in accordance with the third example embodiment are discussed supra with respect to FIGS. 7A and 7B.

Still referring to FIG. 4, UE 406 may receive a data transmission 410 that is associated with a particular HARQ process (e.g., a particular HARQ process ID) from base station 404. In one aspect, the data transmission 410 may be received using a legacy TTI. Alternatively, the data transmission 410 may be received using an sTTI. Using either the legacy TTI or the sTTI, information related to the HARQ process associated with the data transmission 410 may be stored in a subbuffer that is allocated for that HARQ process until an ACK is sent to the base station 404.

In order to determine if the data transmission 410 was properly received and/or decoded, the base station 404 may monitor 405 for an ACK/NACK 415. In addition, the ACK/NACK 415 may include information related to the HARQ ID associated with data transmission 410. When a NACK 415 is transmitted by the UE 406, the UE 406 may monitor 407 a first channel and/or a second channel for a subsequent downlink grant for a retransmission. When a NACK 415 is received, the base station 404 may send a downlink grant 420a for retransmission using DCI in the PDCCH to indicate that the UE 406 may use the legacy TTI for the retransmission 430a (e.g., to receive the retransmission). Additionally and/or alternatively, the downlink grant 420b may be sent using a shortened DCI (sDCI) in the PDCCH or a shortened PDCCH (sPDCCH) in the sTTI to indicate that the UE 406 may use the sTTI for the retransmission 430b (e.g., to receive the retransmission). In one aspect, the UE 406 may be able to use a different TTI to receive the retransmission 430a, 430b than the TTI that was used to receive the original data transmission 410.

If the UE 406 receives a downlink grant 420a for retransmission via DCI in the PDCCH and a downlink grant 420b for retransmission via sDCI in the PDCCH or the sPDCCH in the sTTI that are both associated with the same HARQ ID, the UE 406 may determine 409 which of the downlink grants 420a, 420b is valid. In addition, the UE 406 may drop 411 the downlink grant 420a, 420b for retransmission that is not determined to be valid. The UE 406 may then receive a retransmission 430a using a legacy TTI if downlink grant 420a is determined to be valid, or receive a retransmission 430b using the sTTI if downlink grant 420b is determined to be valid.

Figure 5:
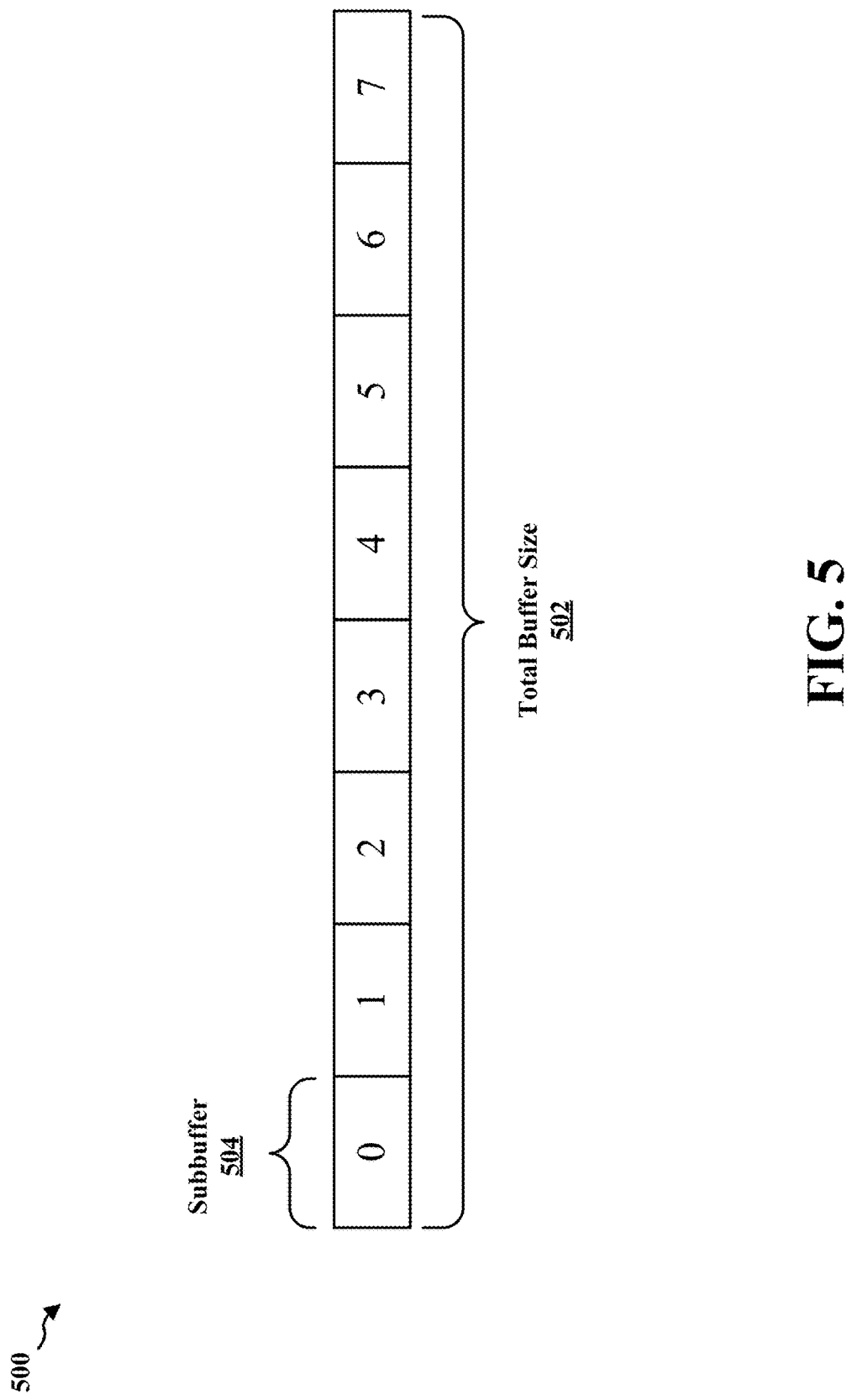
FIG. 5 is a diagram illustrating a buffer that may be used by a UE to accommodate HARQ processes for transmissions with different TTIs in accordance with a first aspect of the present disclosure.

FIG. 5 is a diagram illustrating a buffer 500 that may be used by UE 406 to accommodate HARQ processes for transmissions with different TTIs in accordance with the first example embodiment in FIG. 4. As seen in FIG. 5, the buffer 500 may have a total buffer size 502 (e.g., legacy buffer size) that is partitioned into eight subbuffers 504 to supports eight HARQ processes (e.g., indexed 0-7). In the first example embodiment, each of the HARQ processes may be shared between legacy TTI HARQ processes and sTTI HARQ processes. Using the buffer 500 associated with the first example embodiment, the UE 406 may be able to use a different TTI for reception of the retransmission 430a, 430b than the TTI that was used to receive the original data transmission 410.

Figure 6A:
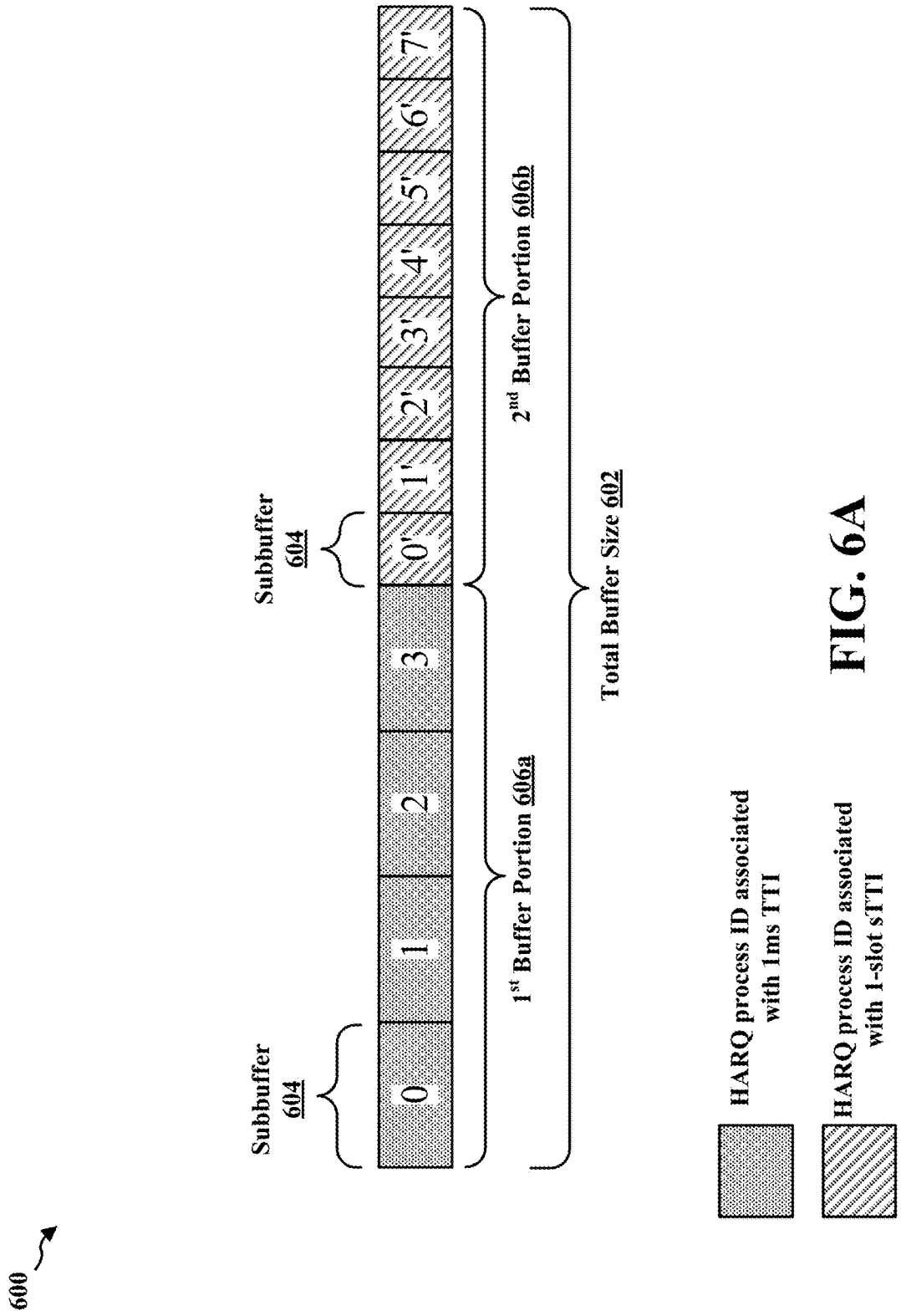
FIG. 6A is a diagram illustrating a buffer that may be used by a UE to accommodate HARQ processes for transmissions with different TTIs in accordance with a second aspect of the present disclosure.

FIG. 6A is a diagram illustrating a buffer 600 that may be used by UE 406 to accommodate HARQ processes for transmissions with different TTIs in accordance with a first aspect of the second example embodiment in FIG. 4. As seen in FIG. 6A, the buffer 600 may have a total buffer size 602 (e.g., legacy buffer size) that is made up of multiple sub-buffers 604. In addition, the total buffer size 602 may be partitioned into a first buffer portion 606a (e.g., associated with legacy TTI HARQ processes) and a second buffer portion 606b (e.g., associated with 1-slot sTTI HARQ processes). In the first aspect of the second example embodiment, the number of legacy HARQ processes (e.g., eight HARQ processes) may be reduced to four legacy HARQ processes to accommodate sTTI HARQ processes without increasing the total buffer size 602. In addition, the first number of HARQ IDs (e.g., indexed 0-3) associated with the legacy TTI HARQ processes are not shared with the second number of HARQ IDs (e.g., indexed 0'-7') associated with the sTTI HARQ processes. In the first aspect of the second example embodiment, HARQ processes may not be shared between the legacy TTI HARQ processes and sTTI HARQ processes.

As in a legacy system, only a few bits (e.g., 3-bits) may be used to indicate the HARQ process ID. For example, 3-bits may be used to indicate the HARQ process ID when the processing timeline is n+4 (e.g., 1-slot sTTI with n+4 timeline or 2-symbol sTTI with n+4 timeline). A processing timeline of n+4 may mean that if a downlink transmission is received in subframe n, the ACK/NACK may be transmitted in subframe n+4. When the processing timeline is n+4, there may be 8 HARQ processes associated with downlink transmissions and/or uplink transmissions. However, when a 2-symbol sTTI with a processing timeline of n+6 (e.g., 12 HARQ processes) or n+8 (e.g., 16 HARQ processes) is used, a 4-bit indication may be used to indicate the HARQ process ID.

Figure 6B:
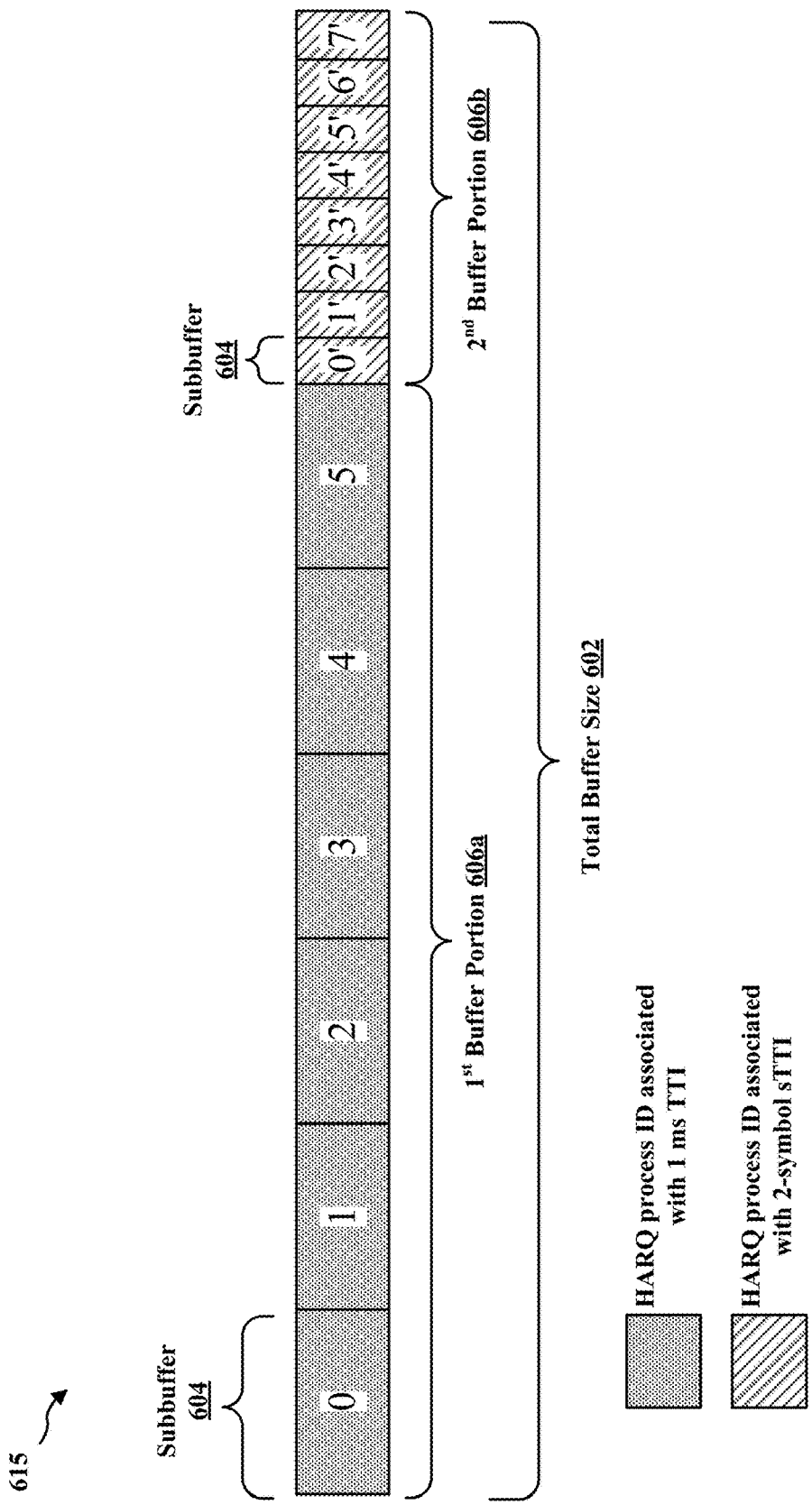
FIG. 6B is a diagram illustrating a buffer that may be used by a UE to accommodate HARQ processes for transmissions with different TTIs in accordance with a third aspect of the present disclosure.

FIG. 6B is a diagram illustrating a buffer 615 that may be used by UE 406 to accommodate HARQ processes for transmissions with different TTIs in accordance with a second aspect of the second example embodiment in FIG. 4. As seen in FIG. 6B, the buffer 615 may have a total buffer size 602 (e.g., legacy buffer size) that is made up of multiple subbuffers 604. In addition, the total buffer size 602 is partitioned into a first buffer portion 606a (e.g., associated with legacy TTI HARQ processes) and a second buffer portion 606b (e.g., associated with 2-symbol sTTI HARQ processes).

In a second aspect of the second example embodiment, the number of legacy HARQ processes (e.g., 8 HARQ processes) may be reduced to 6 legacy HARQ processes to accommodate sTTI HARQ processes without increasing the total buffer size 602. In addition, the first number of HARQ IDs (e.g., indexed 0-5) associated with the legacy TTI HARQ processes are not shared with the second number of HARQ IDs (e.g., indexed 0'-7') associated with the sTTI HARQ processes. In the second aspect of the second example embodiment, HARQ processes may not be shared between the legacy TTI HARQ processes and sTTI HARQ processes. As in a legacy system, only a few bits (e.g., 3-bits) may be used to indicate the HARQ process.

Figure 6C:
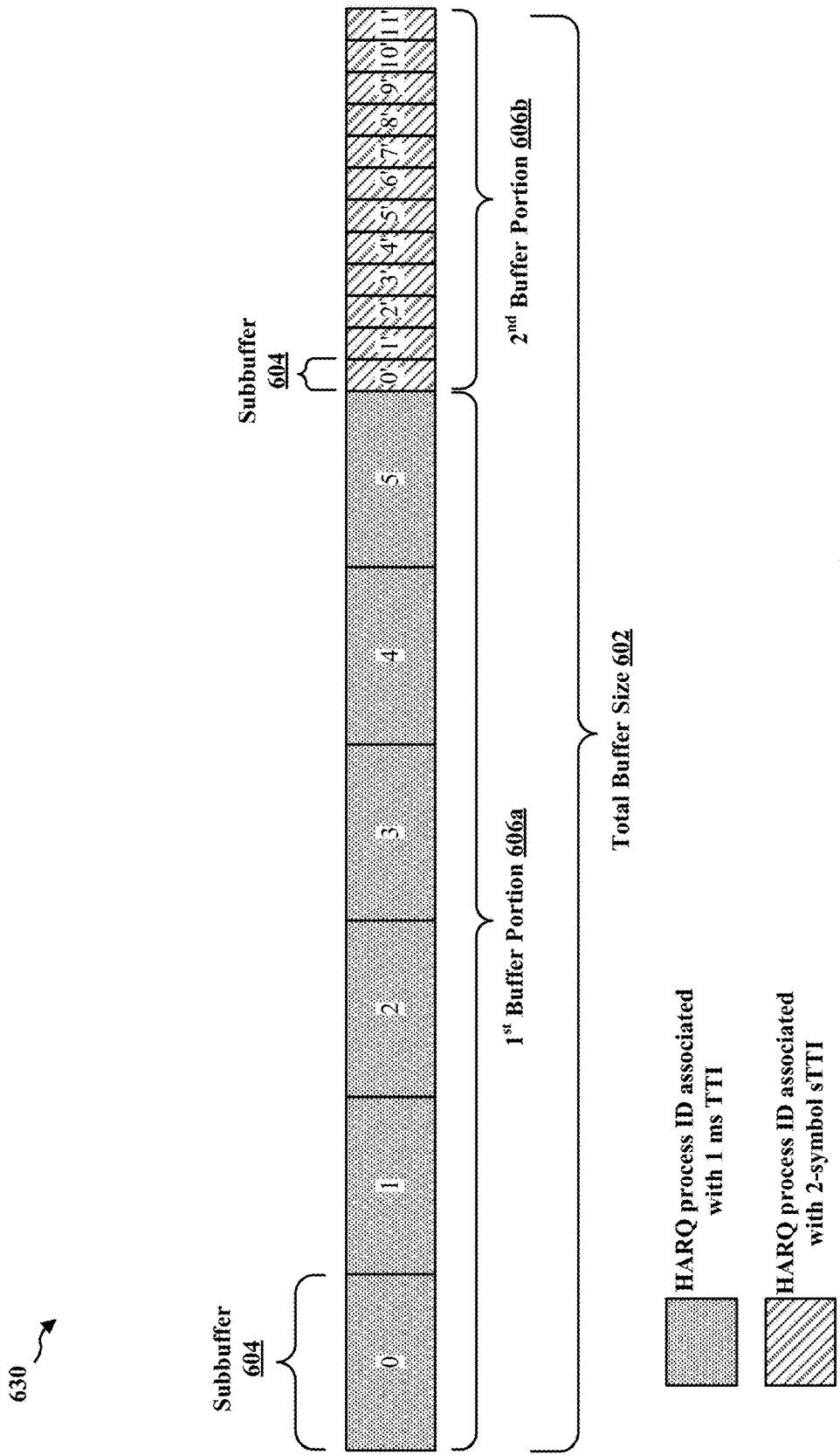
FIG. 6C is a diagram illustrating a buffer that may be used by a UE to accommodate HARQ processes for transmissions with different TTIs in accordance with a fourth aspect of the present disclosure.

FIG. 6C is a diagram illustrating a buffer 630 that may be used by UE 406 to accommodate HARQ processes for transmissions with different TTIs in accordance with a third aspect of the second example embodiment in FIG. 4. As seen in FIG. 6C, the buffer 630 may have a total buffer size 602 (e.g., legacy buffer size) that is made up of multiple sub-buffers 604. In addition, the total buffer size 602 is partitioned into a first buffer portion 606a (e.g., associated with legacy TTI HARQ processes) and a second buffer portion 606b (e.g., associated with 2-symbol sTTI HARQ processes).

In the third aspect of second example embodiment, the number of legacy HARQ processes (e.g., 8 HARQ processes) may be reduced to 6 legacy HARQ processes to accommodate sTTI HARQ processes without increasing the total buffer size 602.

As seen in FIG. 6C, the first number of HARQ IDs (e.g., indexed 0-5) associated with the legacy TTI HARQ processes are not shared with the second number of HARQ IDs (e.g., indexed 0'-11') associated with the sTTI HARQ processes. When an error data transmission is received via TTI, the UE 406 may maintain the error data transmission in subbuffer indexed 0 if HARQ process 0 is associated with the data transmission. When the retransmission is received via sTTI, the UE 406 may maintain the retransmission in a subbuffer 0' when the HARQ process 0' is associated with the retransmission. The data transmission and retransmission may be combined prior to error decoding.

As in a legacy system, only a few bits (e.g., 3-bits) may be needed to indicate the HARQ process. In the third aspect of the second example embodiment, HARQ processes may not be shared between the legacy TTI HARQ processes and sTTI HARQ processes.

Figure 7A:
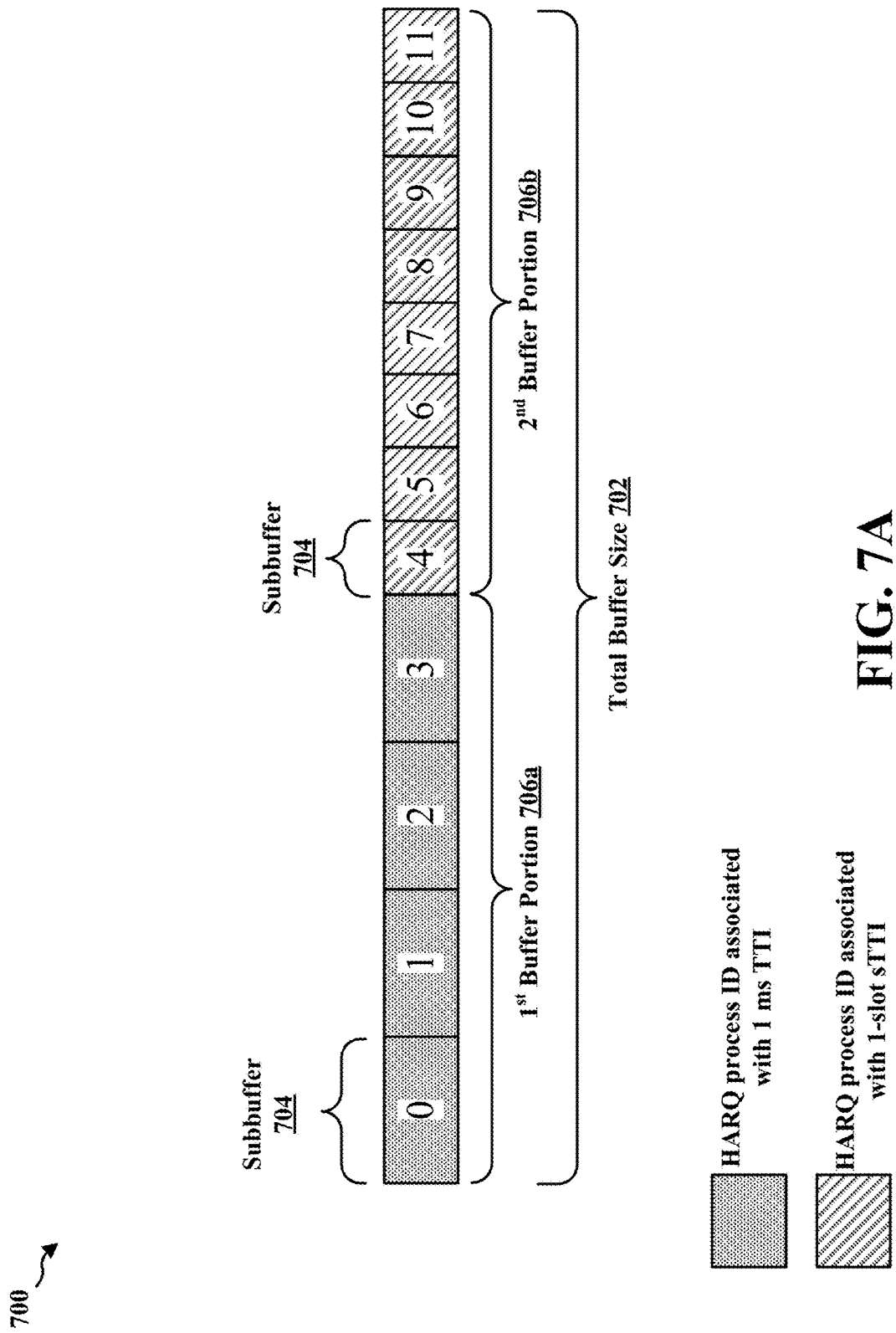
FIG. 7A is a diagram illustrating a buffer that may be used by a UE to accommodate HARQ processes for transmissions with different TTIs in accordance with a fifth aspect of the present disclosure.

FIG. 7A is a diagram illustrating a buffer 700 that may be used by UE 406 to accommodate HARQ processes for transmissions with different TTIs in accordance with a first aspect of the third example embodiment in FIG. 4. As seen in FIG. 7A, the buffer 700 may have a total buffer size 702 (e.g., legacy buffer size) that is made up of multiple subbuffers 704. In addition, the total buffer size 702 may be partitioned into a first buffer portion 706a (e.g., associated with legacy TTI HARQ processes) and a second buffer portion 706b (e.g., associated with 1-slot sTTI HARQ processes). As seen in FIG. 7A, the number of legacy HARQ processes (e.g., 8 HARQ processes) may be reduced to 4 legacy HARQ processes to accommodate sTTI HARQ processes without increasing the total buffer size 602. In addition, a certain number of HARQ IDs (e.g., indexed 4-8) associated with the legacy TTI HARQ processes are not shared with the second number of HARQ IDs (e.g., indexed 4-11) associated with the sTTI HARQ processes. However, as also seen in FIG. 7A, certain HARQ processes (e.g., indexed 0-3) may be shared between the legacy TTI HARQ processes and sTTI HARQ processes. Using the buffer 700 associated with the first aspect of the third example embodiment, the UE 406 may be able to use a different TTI to receive the retransmission 430a, 430b than the TTI that was used to receive the original data transmission 410. In the third example embodiment, one or more additional bits (e.g., four bits) may be needed to indicate the HARQ process.

Figure 7B:
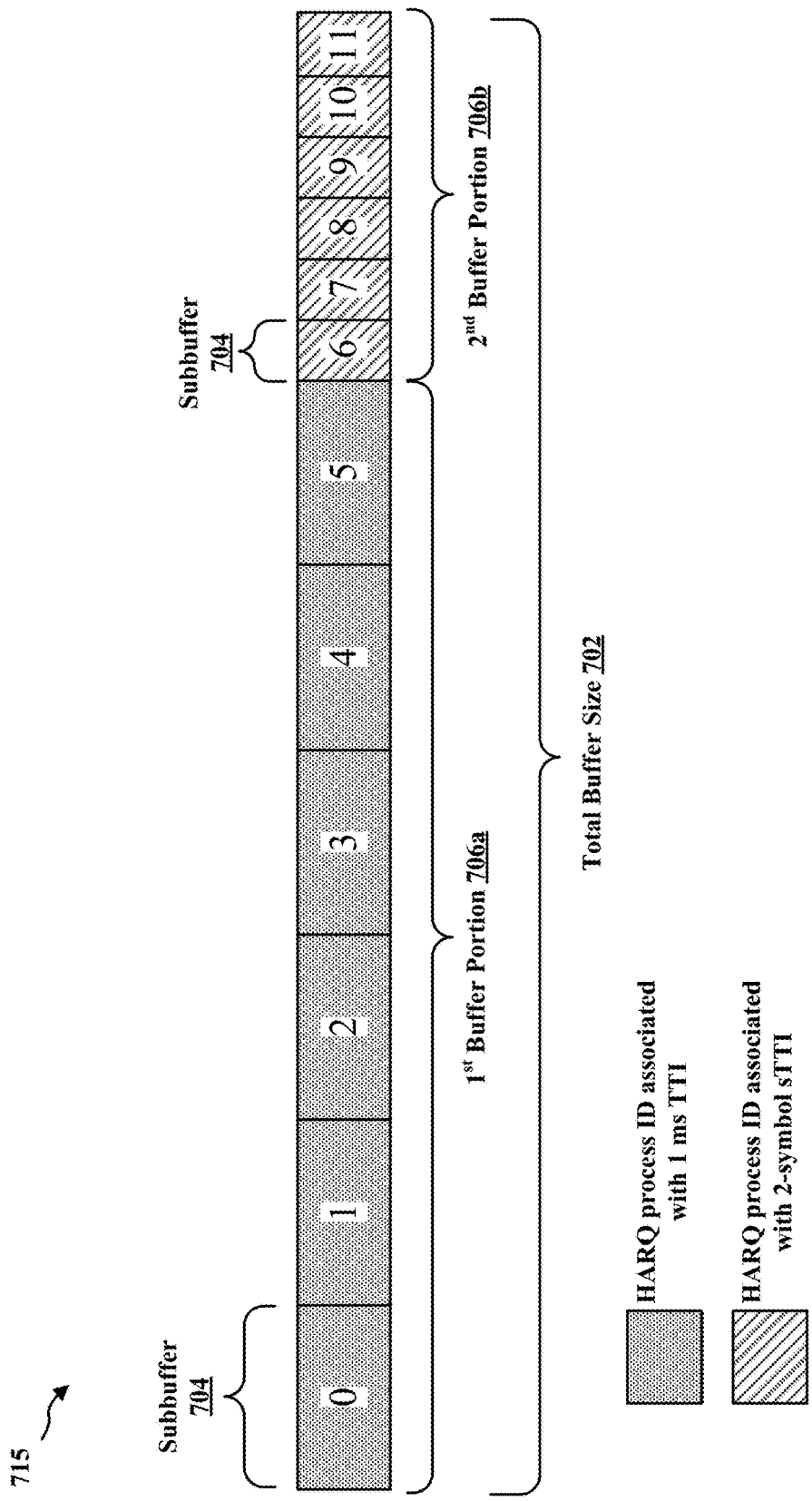
FIG. 7B is a diagram illustrating a buffer that may be used by a UE to accommodate HARQ processes for transmissions with different TTIs in accordance with a sixth aspect of the present disclosure.

FIG. 7B is a diagram illustrating a buffer 715 that may be used by UE 406 to accommodate HARQ processes for transmissions with different TTIs in accordance with a second aspect of the third example embodiment in FIG. 4. As seen in FIG. 7B, the buffer 715 may have a total buffer size 702 (e.g., legacy buffer size) that is made up of multiple subbuffers 704. In addition, the total buffer size 702 may be partitioned into a first buffer portion 706a (e.g., associated with legacy TTI HARQ processes) and a second buffer portion 706b (e.g., associated with 2-symbol sTTI HARQ processes). As seen in FIG. 7B, the number of legacy HARQ processes (e.g., 8 HARQ processes) may be reduced to 6 legacy HARQ processes to accommodate sTTI HARQ processes without increasing the total buffer size 602. In addition, a certain number of HARQ IDs (e.g., indexed 6-7) associated with the legacy TTI HARQ processes are not shared with the second number of HARQ IDs (e.g., indexed 6-11) associated with the sTTI HARQ processes. However, as also seen in FIG. 7B, certain HARQ processes (e.g., indexed 0-5) may be shared between the legacy TTI HARQ processes and sTTI HARQ processes. Using the buffer 715 associated with the second aspect of the third example embodiment, the UE 406 may be able to use a different TTI to receive the retransmission 430a, 430b than the TTI that was used for the original data transmission 410. In the third example embodiment, one or more additional bits (e.g., four bits) may be needed to indicate the HARQ process. When an error data transmission is received via TTI, the UE 406 may maintain the error data transmission in subbuffer indexed 0 if HARQ process 0 is associated with the data transmission. When the retransmission is received via sTTI, the UE 406 may maintain the retransmission in a subbuffer 0 when the HARQ process 0 is associated with the retransmission. The data transmission and retransmission may be combined prior to error decoding.

Additionally and/or alternatively, the buffers 500, 600, 615, 630, 700, 715 may be used by the UE 406 to buffer a data transmission 410 (e.g., associated with a legacy TTI HARQ process or an sTTI HARQ process) that has an error from the base station 404, or buffer a transmission sent to the base station 404 until an ACK is received from the base station 404. For example, the data transmission 410 with the error may be buffered in a subbuffer that is allocated for that particular HARQ process, HARQ process ID, and/or the TTI or sTTI. When the UE 406 receives a retransmission 430a, 430b, the UE 406 may combine the retransmission 430a, 430b with the buffered data transmission 410 in a respective subbuffer (associated with the HARQ process ID, and TTI or sTTI of the retransmission) in the second portion of the buffer prior to channel decoding and error detection, or once an ACK is received from the base station 404 for that HARQ process ID the data transmission may be cleared from the buffer.

Figure 8:
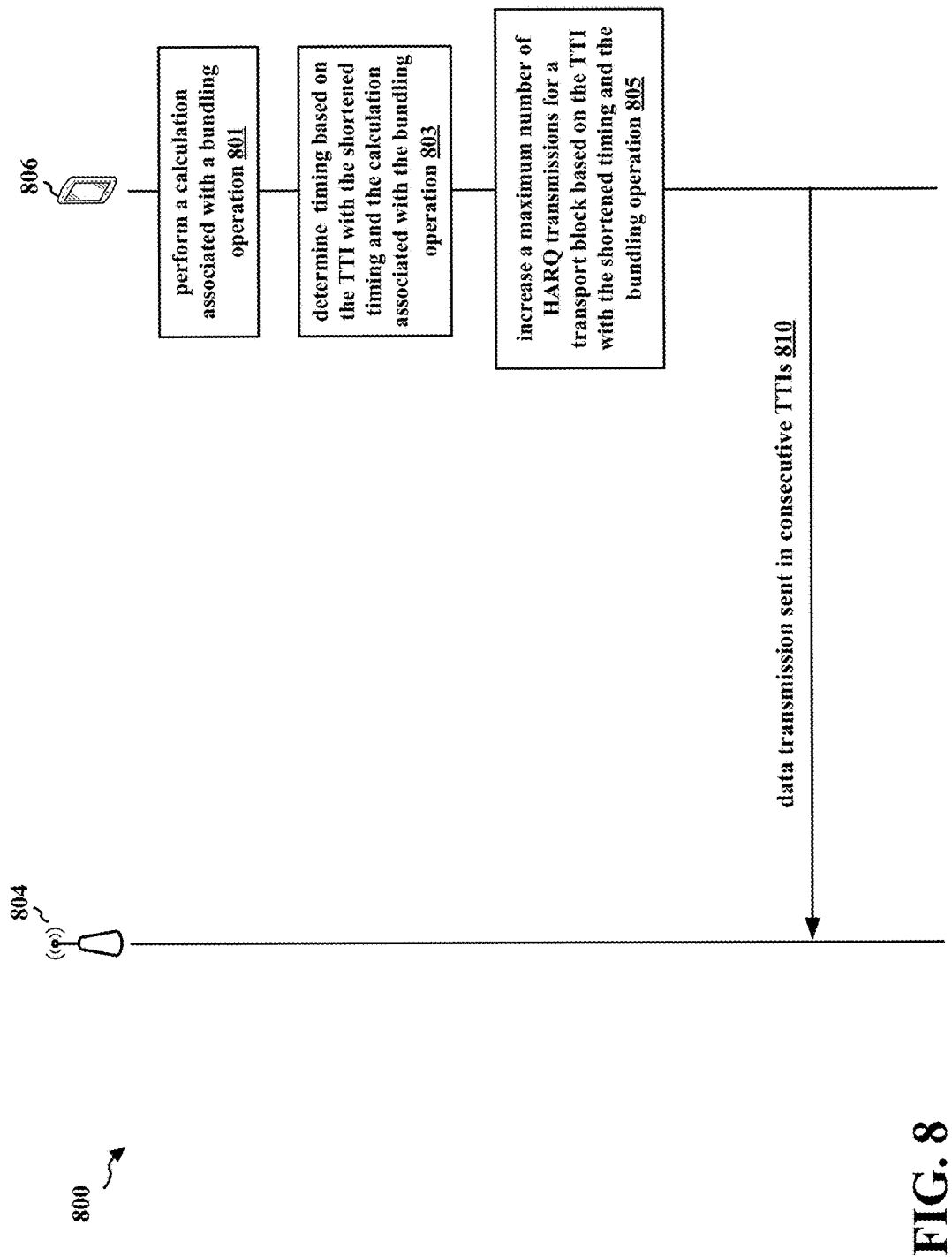
FIG. 8 illustrates a data flow that may be used to enable TTI bundling with a shortened processing time in accordance with certain aspects of the disclosure.

FIG. 8 illustrates a data flow 800 that may be used to enable TTI bundling with a shortened processing time. TTI bundling may be enabled to provide better coverage at cell-edges for services such as voice over IP (VoIP).

As seen in FIG. 8, the data flow 800 may be performed by, for example, a base station 804 (e.g., base station 102, 180, 404, 1050, 1350, eNB 310) and a UE 806 (e.g., 104, 406, 350, the apparatus 1002/1002', 1302/1302'). In an aspect, the UE 806 may be configured for a TTI with shortened timing.

The UE 806 may perform 801 a calculation associated with a bundling operation (e.g., transmission of the same data in consecutive TTIs). In addition, the UE 806 may determine 803 timing based on the TTI with the shortened timing and the calculation associated with the bundling operation (e.g., in certain scenarios the round trip time (RTT) associated with a data packet transmission based on the determined timing may be reduced), and/or increase 805 a maximum number of HARQ transmissions for a transport block based on the TTI with the shortened timing and the bundling operation. In an aspect, the UE 806 may determine 803 the timing based on signaling received from the base station 804. In another aspect, the signaling may indicate the timing to the UE 806.

For example, assuming a bundling size of 4, under the n+4 processing timeline, the HARQ turnaround time may be 12 ms. However, assuming a bundling size of 4, under the n+3 processing timeline, the HARQ turnaround time is 10 ms. Hence, by shortening the processing time (e.g., HARQ turnaround time) a certain amount of time saving may be achieved.

Once TTI bundling is enabled, the UE 806 may send the same data transmission 810 in consecutive TTIs (e.g., four consecutive TTIs). Each of the data transmissions 810 may include different error correction bits.

Figure 9A:
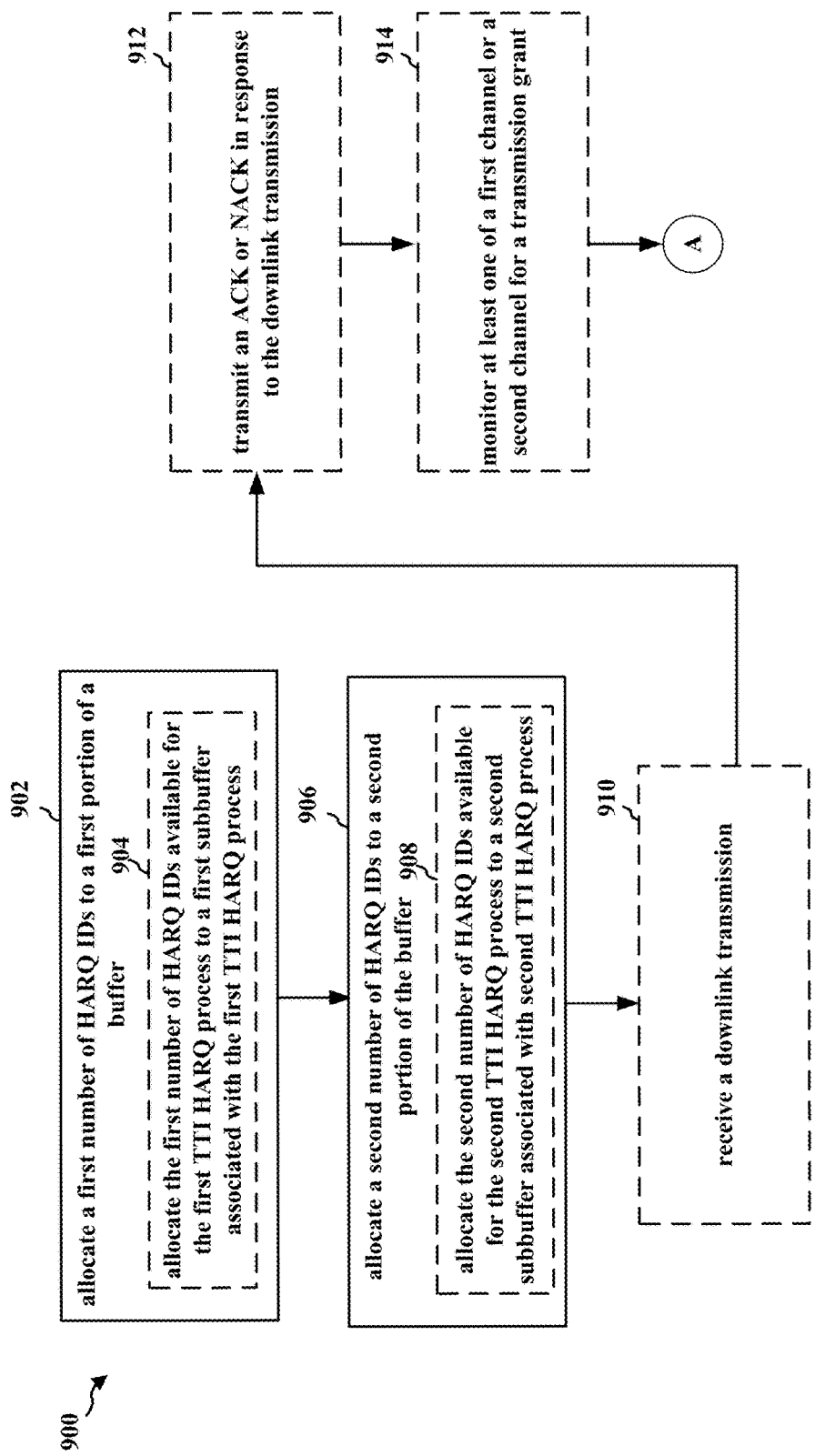
FIGS. 9A and 9B are a flowchart of a method of wireless communication.
Figure 9B:
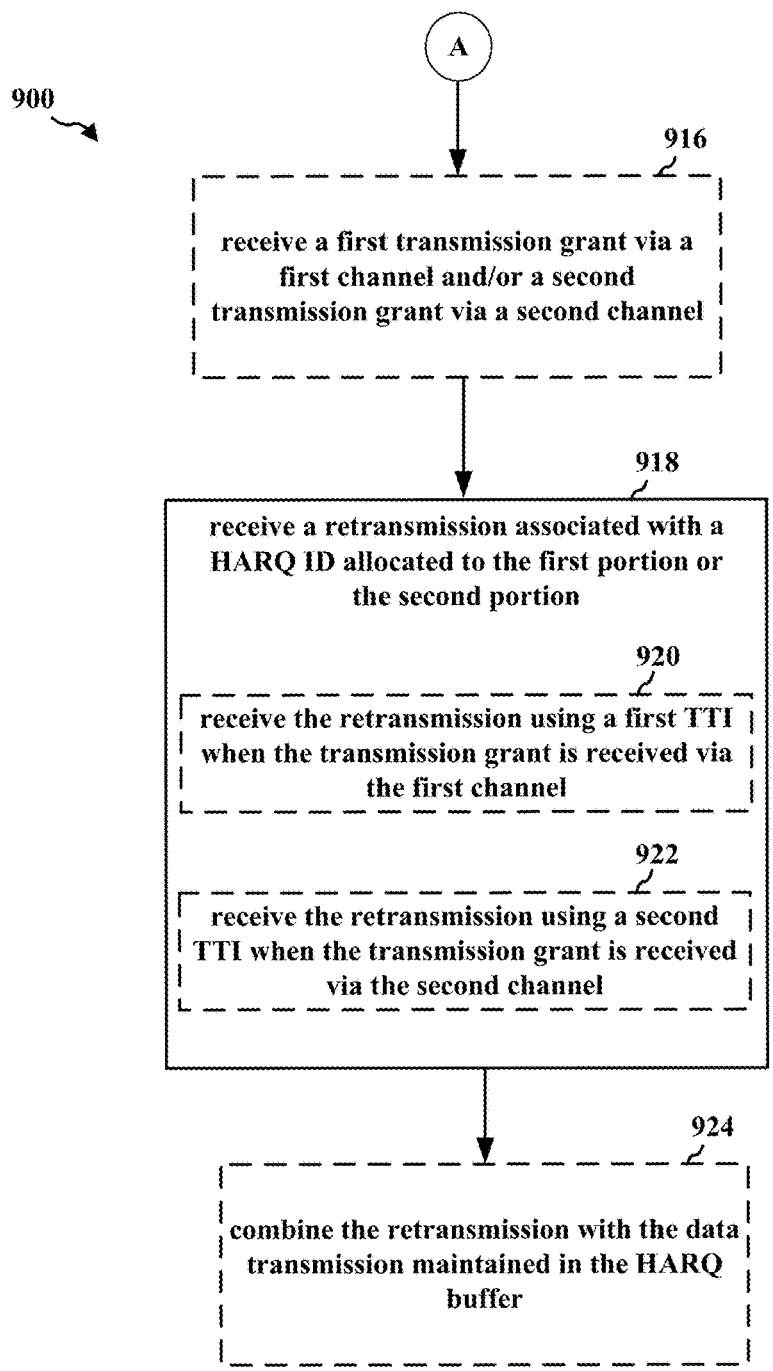

FIGS. 9A and 9B are a flowchart 900 of a method of wireless communication. The method may be performed by a UE (e.g., the UE 104, 310, 406, 806, the apparatus 1002/1002', 1302/1302'). In FIGS. 9A and 9B, optional operations are indicated with dashed lines.

Referring to FIG. 9A, at 902, the UE may allocate a first number of HARQ IDs to a first portion of a buffer. In an aspect, the first number of HARQ IDs may be associated with a first TTI HARQ process. In another aspect, a total number of the second number of HARQ IDs may be greater than a total number of the first number of HARQ IDs. In a further aspect, the first number of HARQ IDs and the second number of HARQ IDs may be shared between the first TTI HARQ process and the second TTI HARQ process. Further, the first number of HARQ IDs associated with the first TTI HARQ process may not be shared with the second number of HARQ IDs associated with the second TTI HARQ process. Further still, some of first number of HARQ IDs and the second number of HARQ IDs may be shared between the first TTI HARQ process and the second TTI HARQ process. Additionally, the first number of HARQ IDs associated with the first TTI HARQ process may be allocated to the first subbuffer and the second number of HARQ IDs associated with the second TTI HARQ process are allocated to the second subbuffer. For example, referring to FIG. 5, the buffer 500 may have a total buffer size 502 (e.g., legacy buffer size) that is partitioned into eight subbuffers 504 to supports eight HARQ processes (e.g., indexed 0-7). In the first example embodiment, each of the HARQ processes may be shared between legacy TTI HARQ processes and sTTI HARQ processes. In addition, referring to FIG. 6A, the total buffer size 602 may be partitioned into a first buffer portion 606a (e.g., associated with legacy TTI HARQ processes). In the first aspect of the second example embodiment, the number of legacy HARQ processes (e.g., eight HARQ processes) may be reduced to four legacy HARQ processes to accommodate sTTI HARQ processes without increasing the total buffer size 602. Further, referring to FIG. 6B, the total buffer size 602 is partitioned into a first buffer portion 606a (e.g., associated with legacy TTI HARQ processes). In the second aspect of the second example embodiment, the number of legacy HARQ processes (e.g., eight HARQ processes) is reduced to six legacy HARQ processes to accommodate sTTI HARQ processes without increasing the total buffer size 602. Additionally, referring to FIG. 6C, the total buffer size 602 is partitioned into a first buffer portion 606a (e.g., associated with legacy TTI HARQ processes). In the third aspect of second example embodiment, the number of legacy HARQ processes (e.g., eight HARQ processes) may be reduced to six legacy HARQ processes to accommodate sTTI HARQ processes without increasing the total buffer size 602. Still further, referring to FIG. 7A, the total buffer size 702 is partitioned into a first buffer portion 706a (e.g., associated with legacy TTI HARQ processes). As seen in FIG. 7A, the number of legacy HARQ processes (e.g., eight HARQ processes) may be reduced to four legacy HARQ processes to accommodate sTTI HARQ processes without increasing the total buffer size 602. In addition, referring to FIG. 7B, the total buffer size 702 may be partitioned into a first buffer portion 706*a* (e.g., associated with legacy TTI HARQ processes). As seen in FIG. 7B, the number of legacy HARQ processes (e.g., eight HARQ processes) may be reduced to six legacy HARQ processes to accommodate sTTI HARQ processes without increasing the total buffer size 602.

Referring to FIG. 9A, at 904, the UE may allocate the first number of HARQ IDs by allocating the first number of HARQ IDs available for the first TTI HARQ process to a first subbuffer associated with the first TTI HARQ process. For example, referring to FIG. 5, the buffer 500 may have a total buffer size 502 (e.g., legacy buffer size) that is partitioned into eight subbuffers 504 to supports eight HARQ processes (e.g., indexed 0-7). In the first example embodiment, each of the HARQ processes may be shared between legacy TTI HARQ processes and sTTI HARQ processes. In addition, referring to FIG. 6A, the total buffer size 602 may be partitioned into a first buffer portion 606*a* (e.g., associated with legacy TTI HARQ processes). In the first aspect of the second example embodiment, the number of legacy HARQ processes (e.g., eight HARQ processes) may be reduced to four legacy HARQ processes to accommodate sTTI HARQ processes without increasing the total buffer size 602. Further, referring to FIG. 6B, the total buffer size 602 is partitioned into a first buffer portion 606*a* (e.g., associated with legacy TTI HARQ processes). In the second aspect of the second example embodiment, the number of legacy HARQ processes (e.g., eight HARQ processes) is reduced to six legacy HARQ processes to accommodate sTTI HARQ processes without increasing the total buffer size 602. Additionally, referring to FIG. 6C, the total buffer size 602 is partitioned into a first buffer portion 606*a* (e.g., associated with legacy TTI HARQ processes). In the third aspect of second example embodiment, the number of legacy HARQ processes (e.g., eight HARQ processes) may be reduced to six legacy HARQ processes to accommodate sTTI HARQ processes without increasing the total buffer size 602. Still further, referring to FIG. 7A, the total buffer size 702 is partitioned into a first buffer portion 706*a* (e.g., associated with legacy TTI HARQ processes). As seen in FIG. 7A, the number of legacy HARQ processes (e.g., eight HARQ processes) may be reduced to four legacy HARQ processes to accommodate sTTI HARQ processes without increasing the total buffer size 602. In addition, referring to FIG. 7B, the total buffer size 702 may be partitioned into a first buffer portion 706*a* (e.g., associated with legacy TTI HARQ processes). As seen in FIG. 7B, the number of legacy HARQ processes (e.g., eight HARQ processes) may be reduced to six legacy HARQ processes to accommodate sTTI HARQ processes without increasing the total buffer size 602.

Referring to FIG. 9A, at 906, the UE may allocate a second number of HARQ IDs to a second portion of the buffer. In an aspect, the second number of HARQ IDs may be associated with a second TTI HARQ process. Additionally, the first portion and second portion may not change a total buffer size. In another aspect, a second TTI associated with the second TTI HARQ process may be shorter than a first TTI associated with the first TTI HARQ process. In a further aspect, the first TTI may be a 1 ms TTI, and the second TTI is a two symbol based TTI or a slot based TTI. In an additional aspect, the first number of HARQ IDs and the second number of HARQ IDs may be shared between the first TTI HARQ process and the second TTI HARQ process. For example, referring to FIG. 5, the buffer 500 may have a total buffer size 502 (e.g., legacy buffer size) that is partitioned into eight subbuffers 504 to supports eight HARQ processes (e.g., indexed 0-7). In the first example embodiment, each of the HARQ processes may be shared between legacy TTI HARQ processes and sTTI HARQ processes. In addition, referring to FIG. 6A, the total buffer size 602 may be partitioned into a second buffer portion 606*b* (e.g., associated with 1-slot sTTI HARQ processes). In the first aspect of the second example embodiment, the number of legacy HARQ processes (e.g., eight HARQ processes) may be reduced to four legacy HARQ processes to accommodate sTTI HARQ processes without increasing the total buffer size 602. Further, referring to FIG. 6B, the total buffer size 602 may be partitioned into a second buffer portion 606*b* (e.g., associated with 2-symbol sTTI HARQ processes). In the second aspect of the second example embodiment, the number of legacy HARQ processes (e.g., eight HARQ processes) is reduced to six legacy HARQ processes to accommodate sTTI HARQ processes without increasing the total buffer size 602. Further still, referring to FIG. 6C, the total buffer size 602 may be partitioned into a second buffer portion 606*b* (e.g., associated with 2-symbol sTTI HARQ processes). In the third aspect of second example embodiment, the number of legacy HARQ processes (e.g., eight HARQ processes) may be reduced to six legacy HARQ processes to accommodate sTTI HARQ processes without increasing the total buffer size 602. Further still, referring to FIG. 7A, the total buffer size 702 may be partitioned into a second buffer portion 706*b* (e.g., associated with 1-slot and/or 2-symbol sTTI HARQ processes). As seen in FIG. 7A, the number of legacy HARQ processes (e.g., eight HARQ processes) may be reduced to four legacy HARQ processes to accommodate sTTI HARQ processes without increasing the total buffer size 602. In addition, referring to FIG. 7B, the total buffer size 702 may be partitioned into a second buffer portion 706*b* (e.g., associated with 2-symbol sTTI HARQ processes). As seen in FIG. 7B, the number of legacy HARQ processes (e.g., eight HARQ processes) may be reduced to six legacy HARQ processes to accommodate sTTI HARQ processes without increasing the total buffer size 602.

Referring to FIG. 9A, at 908, the UE may allocate the second number of HARQ IDs by allocating the second number of HARQ IDs available for the second TTI HARQ process to a second subbuffer associated with second TTI HARQ process. In an aspect, the first subbuffer and the second subbuffer do not overlap. For example, referring to FIG. 5, the buffer 500 may have a total buffer size 502 (e.g., legacy buffer size) that is partitioned into eight subbuffers 504 to support eight HARQ processes (e.g., indexed 0-7). In the first example embodiment, each of the HARQ processes may be shared between legacy TTI HARQ processes and sTTI HARQ processes. In addition, referring to FIG. 6A, the total buffer size 602 may be partitioned into a second buffer portion 606*b* (e.g., associated with 1-slot sTTI HARQ processes). In the first aspect of the second example embodiment, the number of legacy HARQ processes (e.g., eight HARQ processes) may be reduced to four legacy HARQ processes to accommodate sTTI HARQ processes without increasing the total buffer size 602. Further, referring to FIG. 6B, the total buffer size 602 may be partitioned into a second buffer portion 606*b* (e.g., associated with 2-symbol sTTI HARQ processes). In the second aspect of the second example embodiment, the number of legacy HARQ processes (e.g., eight HARQ processes) is reduced to six legacy HARQ processes to accommodate sTTI HARQ processes without increasing the total buffer size 602. Further still, referring to FIG. 6C, the total buffer size 602 may be partitioned into a second buffer portion 606*b* (e.g., associated with 2-symbol sTTI HARQ processes). In the third aspect of second example embodiment, the number of legacy HARQ processes (e.g., eight HARQ processes) may be reduced to six legacy HARQ processes to accommodate sTTI HARQ processes without increasing the total buffer size 602. Further still, referring to FIG. 7A, the total buffer size 702 may be partitioned into a second buffer portion 706*b* (e.g., associated with 1-slot and/or 2-symbol sTTI HARQ processes). As seen in FIG. 7A, the number of legacy HARQ processes (e.g., eight HARQ processes) may be reduced to four legacy HARQ processes to accommodate sTTI HARQ processes without increasing the total buffer size 602. In addition, referring to FIG. 7B, the total buffer size 702 may be partitioned into a second buffer portion 706*b* (e.g., associated with 2-symbol sTTI HARQ processes). As seen in FIG. 7B, the number of legacy HARQ processes (e.g., eight HARQ processes) may be reduced to six legacy HARQ processes to accommodate sTTI HARQ processes without increasing the total buffer size 602.

Referring to FIG. 9A, at 910, the UE may receive a downlink transmission from a base station. For example, referring to FIG. 4, UE 406 may receive a data transmission 410 that is associated with a particular HARQ process (e.g., HARQ process ID) from base station 404. In one aspect, the data transmission 410 may be received using a legacy TTI. Alternatively, the data transmission 410 may be received using an sTTI. Using either the legacy TTI or the sTTI, information related to the HARQ process associated with the data transmission 410 may be stored in a subbuffer that is allocated for that HARQ process, e.g., until an ACK is sent to the base station 404.

Referring to FIG. 9A, at 912, the UE may transmit an ACK or NACK in response to the downlink transmission. For example, referring to FIG. 4, in order to determine if the data transmission 410 was properly received and/or decoded, the base station 404 may monitor 405 for an ACK/NACK 415 that is transmitted by the UE 406. In addition, the ACK/NACK 415 may include information related to the HARQ ID associated with data transmission 410. When a NACK 415 is received, the base station may send a downlink grant 420*a* for retransmission using DCI in the PDCCH to indicate that the UE 406 may use the legacy TTI for the retransmission 430*a* (e.g., to receive the retransmission).

Referring to FIG. 9A, at 914, the UE may monitor at least one of a first channel or a second channel for a transmission grant. In an aspect, the transmission grant may include information related to at least one of the first number of HARQ IDs or the second number of HARQ IDs. In another aspect, the first channel may be a PDCCH and the second channel may be an sPDCCH. For example, referring to FIG. 4, when a NACK 415 is transmitted by the UE 406, the UE 406 may monitor 407 a first channel and/or a second channel for a subsequent downlink grant for a retransmission. Referring to FIG. 9B, at 916, the UE may receive a first transmission grant via a first channel and/or a second transmission grant via a second channel. In an aspect, the first transmission grant may include the information related to one of the first number of HARQ IDs, and the second transmission grant may include the information related to one of the second number of HARQ IDs. For example, referring to FIG. 4, the downlink grant 420*a*, 420*b* may include information related to the HARQ ID associated with data transmission 410.

Referring to FIG. 9B, at 918, the UE may receive a retransmission (e.g., HARQ response) associated with a HARQ ID allocated to the first portion of the buffer or the second portion of the buffer. For example, referring to FIG. 4, the downlink grant 420*a* for the retransmission may be sent using DCI in the PDCCH to indicate that the UE 406 may use the legacy TTI to receive the retransmission 430*a*. Additionally and/or alternatively, the downlink grant 420*b* may be sent using sDCI in the PDCCH or the sPDCCH in the sTTI to indicate that the UE 406 may use the sTTI to receive the retransmission 430*b*. In one aspect, the UE 406 may be able to use a different TTI to receive the retransmission 430*a*, 430*b* than the TTI that was used to receive the original data transmission 410.

Referring to FIG. 9B, at 920, the UE may receive the retransmission by receiving the retransmission using a first TTI when the transmission grant is received via the first channel. For example, referring to FIG. 4, the downlink grant 420*a* may be received using DCI in the PDCCH to indicate that the UE 406 may use the legacy TTI to receive the retransmission 430*a*. Additionally and/or alternatively, the downlink grant 420*b* may be sent using sDCI in the PDCCH or the sPDCCH in the sTTI to indicate that the UE 406 may use the sTTI to receive the retransmission 430*b*. In one aspect, the UE 406 may be able to use a different TTI to receive the retransmission 430*a*, 430*b* than the TTI that was used to receive the original data transmission 410.

Referring to FIG. 9B, at 922, the UE may receive the HARQ response by receiving the retransmission using a second TTI when the transmission grant is received via the second channel. For example, referring to FIG. 4, the downlink grant 420*a* may be sent using DCI in the PDCCH to indicate that the UE 406 may use the legacy TTI to receive the retransmission 430*a*. Additionally and/or alternatively, the downlink grant 420*b* may be sent using sDCI in the PDCCH or the sPDCCH in the sTTI to indicate that the UE 406 may use the sTTI to receive the retransmission 430*b*. In one aspect, the UE 406 may be able to use a different TTI to receive the retransmission 430*a*, 430*b* than the TTI that was used to receive the original data transmission 410.

Referring to FIG. 9B, at 924, the UE may combine the retransmission with the data transmission maintained in the HARQ buffer. For example, referring to FIG. 4, the UE 406 may buffer a data transmission 410 (e.g., associated with a legacy TTI HARQ process or an sTTI HARQ process) that has an error from the base station 404. For example, the data transmission 410 with the error may be buffered in a subbuffer that is allocated for that particular HARQ process. When the UE 406 receives a retransmission 430*a*, 430*b*, the UE 406 may combine the retransmission 430*a*, 430*b* with the buffered data transmission 410 in the allocated subbuffer prior to channel decoding and error detection.

Figure 10:
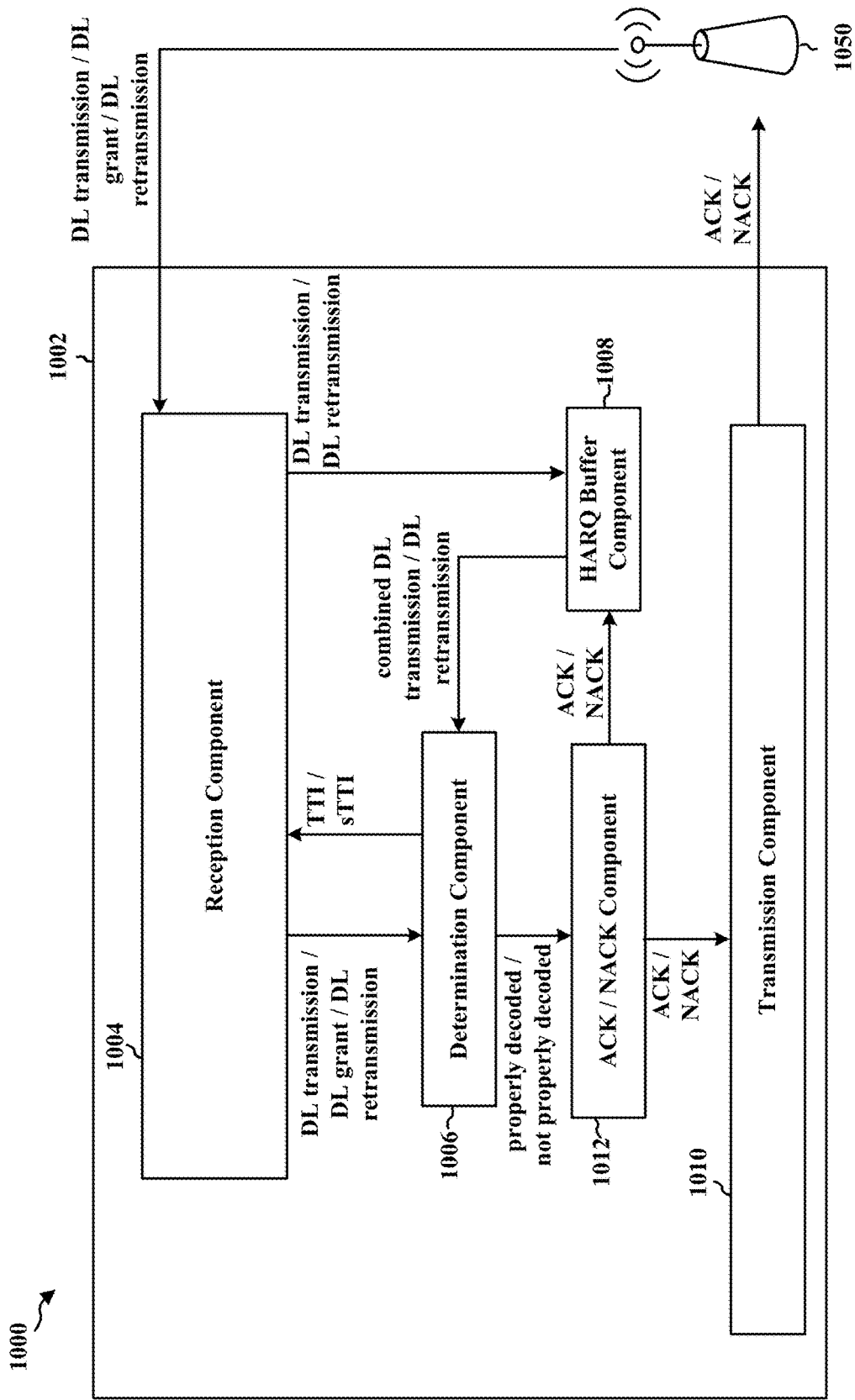
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE (e.g., the UE 104, 350, 406, 806, the apparatus 1002', 1302/1302') that is in communication with a base station 1050 (e.g., the base station 102, 180, 404, 804, 1350, the eNB 310). The apparatus may include a reception component 1004, a determination component 1006, a HARQ buffer component 1008, a transmission component 1010, and an ACK/NACK component 1012.

The HARQ buffer component 1008 may be configured to allocate a first number of HARQ IDs to a first portion of a buffer. In an aspect, the first number of HARQ IDs may be associated with a first TTI HARQ process. In addition, the HARQ buffer component 1008 may be configured to allocate the first the first number of HARQ IDs by allocating the first number of HARQ IDs available for the first TTI HARQ process to a first subbuffer associated with the first TTI HARQ process. The HARQ buffer component 1008 may be configured to allocate the second the first number of HARQ IDs by allocating the second number of HARQ IDs available for the second TTI HARQ process to a second subbuffer associated with second TTI HARQ process. In another aspect, a total number of the second number of HARQ IDs may be greater than a total number of the first number of HARQ IDs. In a further aspect, the first number of HARQ IDs and the second number of HARQ IDs may be shared between the first TTI HARQ process and the second TTI HARQ process. Further, the first number of HARQ IDs associated with the first TTI HARQ process may not be shared with the second number of HARQ IDs associated with the second TTI HARQ process. Additionally, the first number of HARQ IDs associated with the first TTI HARQ process may be allocated to the first subbuffer and the second number of HARQ IDs associated with the second TTI HARQ process are allocated to the second subbuffer. In an aspect, the first subbuffer and the second subbuffer may not overlap.

The reception component 1004 may be configured to receive a data transmission from the base station 1050. In an aspect, the data transmission may be received using a legacy TTI and/or an sTTI. The reception component 1004 may be configured to send a signal associated with the downlink transmission to one or more of the determination component 1006 and/or the HARQ buffer component 1008. The HARQ buffer component 1008 may be configured to maintain the DL transmission in an associated buffer associated with the HARQ ID and/or TTI or sTTI of the DL transmission until an ACK is sent for that HARQ ID to the base station 1050.

The determination component 1006 may be configured to determine if the data transmission can be properly decoded. Based on the outcome of the determination, the determination component 1006 may send a signal indicating that the data transmission was properly decoded or not properly decoded to the ACK/NACK component 1012.

The ACK/NACK component 1012 may be configured to generate an ACK when the data transmission is properly decoded by the determination component 1006. Otherwise, the ACK/NACK component 1012 may be configured to generate a NACK when the data transmission is not properly decoded by the determination component 1006. The ACK/NACK component 1012 may be configured to send a signal associated with the ACK or NACK to one or more of the transmission component 1010 and/or the HARQ buffer component 1008. The transmission component 1010 may be configured to send the ACK or NACK to the base station 1050.

The HARQ buffer component 1008 may be configured to clear the buffer associated with the data transmission (e.g., the buffer associated with HARQ ID of the data transmission) when a signal associated with an ACK is received from the ACK/NACK component 1012. Alternatively, the HARQ buffer component 1008 may be configured to maintain information associated with the data transmission (e.g., in the buffer associated with the HARQ ID and/or TTI or sTTI of the data transmission) when a signal associated with a NACK is received from the ACK/NACK component 1012.

The reception component 1004 may be configured to monitor at least one of a first channel or a second channel for a transmission grant. In an aspect, the transmission grant may include information related to at least one of the first number of HARQ IDs or the second number of HARQ IDs. In another aspect, the first channel may be a PDCCH and the second channel may be an sPDCCH.

The reception component 1004 may be configured to receive a retransmission associated with a HARQ ID allocated to the first portion of the buffer or the second portion of the buffer. In certain configurations, the reception component 1004 may be configured to receive the retransmission by receiving the retransmission using a first TTI when the transmission grant is received via the first channel. In certain other configurations, the reception component 1004 may be configured to receive the retransmission by receiving the HARQ response using a second TTI when the transmission grant is received via the second channel. The reception component 1004 may send a signal associated with the retransmission to one or more of the determination component 1006 and/or the HARQ buffer component 1008.

The HARQ buffer component 1008 may be configured to combine the retransmission with the DL transmission maintained in the HARQ buffer. The HARQ buffer component 1008 may be configured to send a signal associated with the combined DL transmission/retransmission to the determination component 1006. The determination component 1006 may be configured to determine if the combined DL transmission/retransmission can be properly decoded. Based on the outcome of the determination, the determination component 1006 may send a signal indicating that the combined data transmission/retransmission was properly decoded or not properly decoded to the ACK/NACK component 1012.

The ACK/NACK component 1012 may be configured to generate an ACK when the combined data transmission/retransmission is properly decoded by the determination component 1006. Otherwise, the ACK/NACK component 1012 may be configured to generate a NACK when the combined data transmission/retransmission is not properly decoded by the determination component 1006. The ACK/NACK component 1012 may be configured to send a signal associated with the ACK or NACK to one or more of the transmission component 1010 and/or the HARQ buffer component 1008. The transmission component 1010 may be configured to send the ACK or NACK to the base station 1050.

The HARQ buffer component 1008 may be configured to clear the buffer associated with the HARQ ID of the data transmission/retransmission when a signal associated with an ACK is received from the ACK/NACK component 1012. Alternatively, the HARQ buffer component 1008 may be configured to maintain information associated with the data transmission and/or the retransmission (e.g., in the buffer associated with the HARQ ID, TTI, or sTTI of the data transmission/retransmission) when a signal associated with a NACK is received from the ACK/NACK component 1012.

The apparatus may include additional components that perform each of the blocks of the algorithm in the aforementioned flowcharts of FIGS. 9A and 9B. As such, each block in the aforementioned flowcharts of FIGS. 9A and 9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
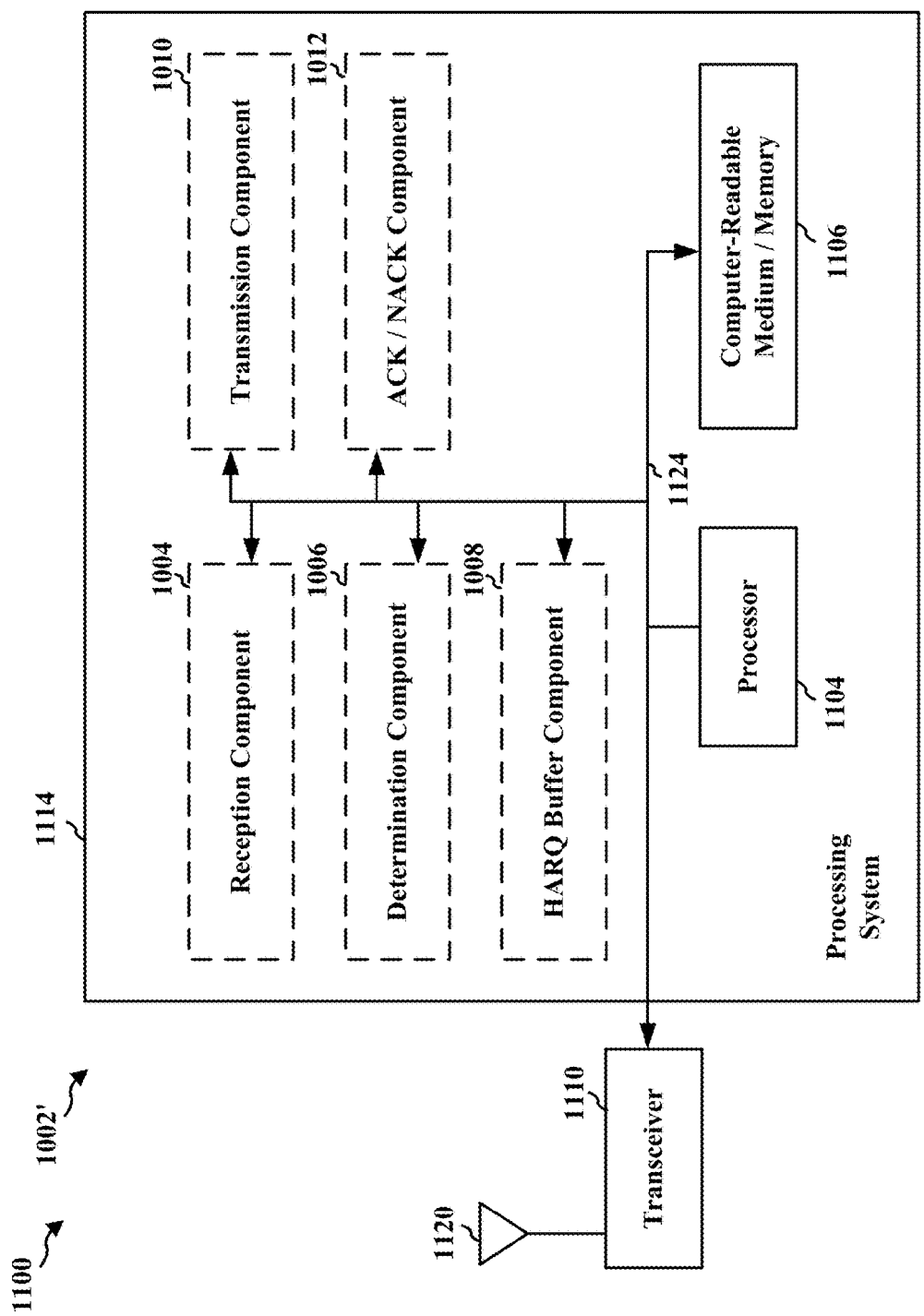
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In certain configurations, the apparatus 1002/1002' for wireless communication may include means for allocating a first number of HARQ IDs to a first portion of a buffer. In an aspect, the first number of HARQ IDs may be associated with a first TTI HARQ process. In another aspect, a total number of the second number of HARQ IDs may be greater than a total number of the first number of HARQ IDs. In a further aspect, the first number of HARQ IDs and the second number of HARQ IDs may be shared between the first TTI HARQ process and the second TTI HARQ process. Further, the first number of HARQ IDs associated with the first TTI HARQ process may not be shared with the second number of HARQ IDs associated with the second TTI HARQ process. Further still, some of first number of HARQ IDs and the second number of HARQ IDs may be shared between the first TTI HARQ process and the second TTI HARQ process. Additionally, the first number of HARQ IDs associated with the first TTI HARQ process may be allocated to the first subbuffer and the second number of HARQ IDs associated with the second TTI HARQ process are allocated to the second subbuffer. In certain aspects, the means for allocating the first number of HARQ IDs may be configured to allocate the first number of HARQ IDs available for the first TTI HARQ process to a first subbuffer associated with the first TTI HARQ process. In certain other configurations, the apparatus 1002/1002' for wireless communication may include means for allocating a second number of HARQ IDs to a second portion of the buffer. In an aspect, the second number of HARQ IDs may be associated with a second TTI HARQ process. Additionally, the first portion and second portion may not change a total buffer size. In another aspect, a second TTI associated with the second TTI HARQ process may be shorter than a first TTI associated with the first TTI HARQ process. In a further aspect, the first TTI may be a 1 ms TTI, and the second TTI is a two symbol based TTI or a slot based TTI. In an additional aspect, the first number of HARQ IDs and the second number of HARQ IDs may be shared between the first TTI HARQ process and the second TTI HARQ process. In certain other aspects, the means for allocating the second number of HARQ IDs may be configured to allocate the second number of HARQ IDs available for the second TTI HARQ process to a second subbuffer associated with second TTI HARQ process. In an aspect, the first subbuffer and the second subbuffer do not overlap. In certain other configurations, the apparatus 1002/1002' for wireless communication may include means for receiving a downlink transmission from a base station. In certain other configurations, the apparatus 1002/1002' for wireless communication may include means for transmitting an ACK or NACK in response to the downlink transmission. In certain other configurations, the apparatus 1002/1002' for wireless communication may include means for monitoring at least one of a first channel or a second channel for a transmission grant. In an aspect, the transmission grant may include information related to at least one of the first number of HARQ IDs or the second number of HARQ IDs. In another aspect, the first channel may be a PDCCH and the second channel may be an sPDCCH. In certain other configurations, the apparatus 1002/1002' for wireless communication may include means for receive a retransmission associated with a HARQ ID allocated to the first portion of the buffer or the second portion of the buffer. In certain aspects, the means for receiving the retransmission may be configured to receive the retransmission using a first TTI when the transmission grant is received via the first channel. In certain other aspects, the means for receiving the retransmission may be configured to receive the retransmission using a second TTI when the transmission grant is received via the second channel. In certain other configurations, the apparatus 1002/1002' for wireless communication may include means for combining the retransmission with the data transmission maintained in the HARQ buffer. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
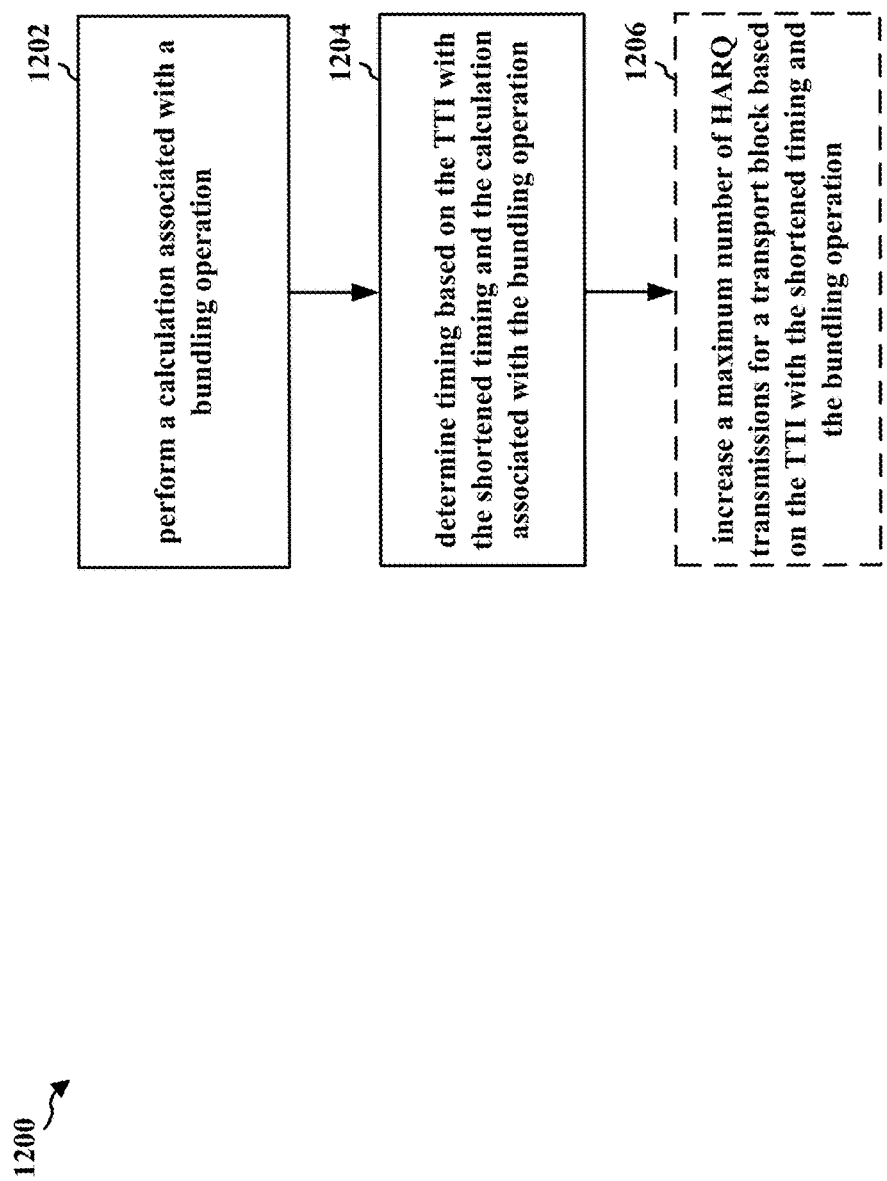
FIG. 12 is a flowchart of a method of wireless communication.

FIG. 12 is a flowchart 1200 of a method of wireless communication. The method may be performed by a UE (e.g., the UE 104, 310, 406, 806, the apparatus 1002/1002', 1302/1302'). In an aspect, the UE may be configured for a TTI with shortened timing. In FIG. 12, optional operations are indicated with dashed lines.

At 1202, the UE may perform a calculation associated with a bundling operation. For example, referring to FIG. 8, UE 806 may perform 801 a calculation associated with a bundling operation (e.g., transmission of the same data in consecutive TTIs).

At 1204, the UE may determine timing based on the TTI with the shortened timing and the calculation associated with the bundling operation. In an aspect, the UE may determine the timing based on signaling received from a base station. In another aspect, the signaling may indicate the timing to the UE. In certain aspects, the RTT associated with the data packet transmission may be reduced based on the determined timing (e.g., when n+3 is used rather than n+4). For example, referring to FIG. 8, the UE 806 may determine 803 timing based on the TTI with the shortened timing and the calculation associated with the bundling operation.

At 1206, the UE may increase a maximum number of HARQ transmissions for a transport block based on the TTI with the shortened timing and the bundling operation. For example, referring to FIG. 8, the UE 806 may increase 805 a maximum number of HARQ transmissions for a transport block based on the TTI with the shortened timing and the bundling operation. For example, assuming a bundling size of 4, under the n+4 processing timeline, the HARQ turn-around time may be 12 ms. However, assuming a bundling size of 4, under the n+3 processing timeline, the HARQ turnaround time is 10 ms. Hence, by shortening the processing time (e.g., HARQ turnaround time) a certain amount of time saving may be achieved. Once TTI bundling is enabled, the UE 806 may send the same data transmission 810 in consecutive TTIs (e.g., four consecutive TTIs). Each of the data transmissions 810 may include different error correction bits.

Figure 13:
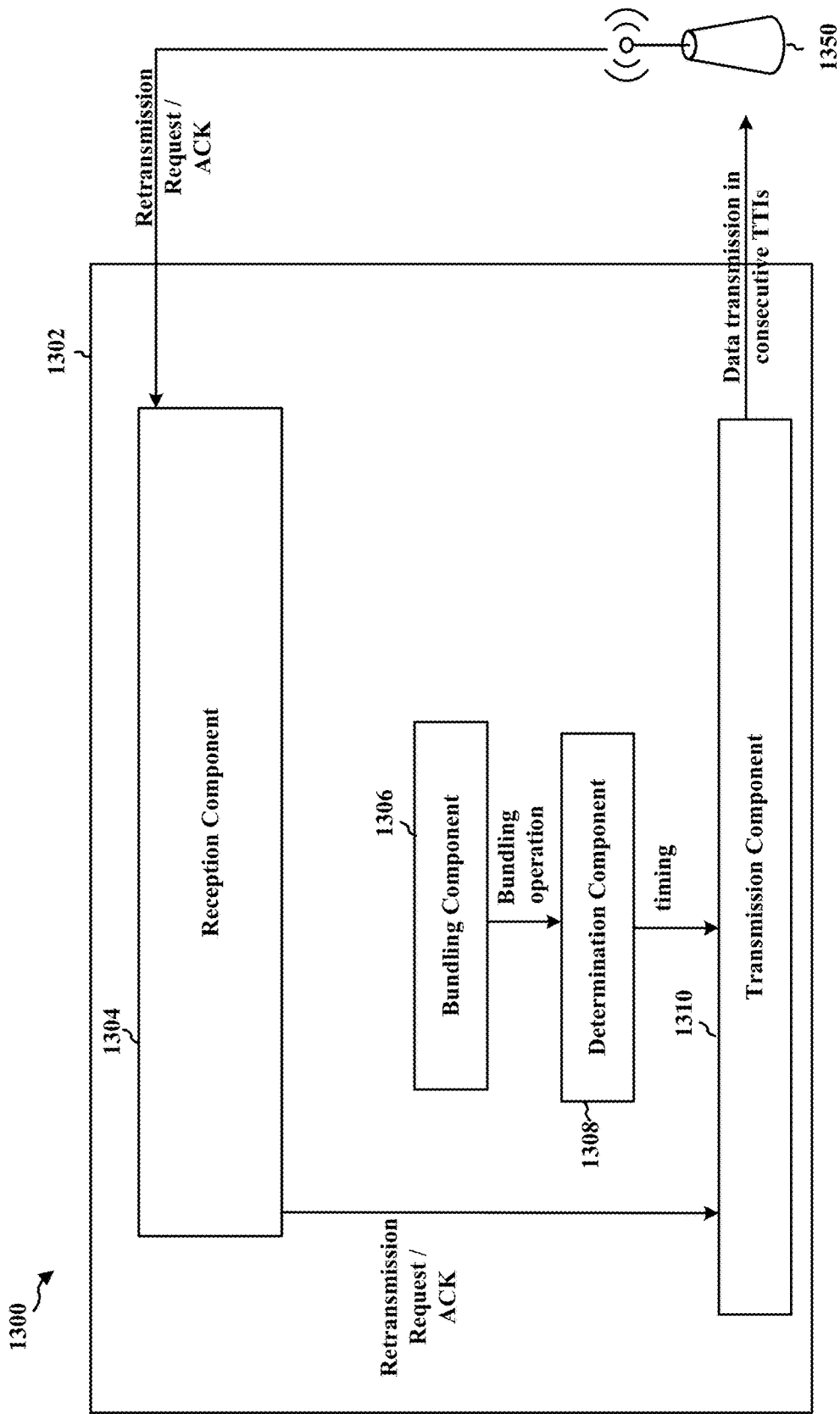
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE (e.g., the UE 104, 310, 406, 806, the apparatus 1002/1002', 1302') in communication with a base station 1350 (e.g., the base station 102, 180, 404, 804, 1050, the eNB 310). The apparatus may include a reception component 1304, a bundling component 1306, a determination component 1308, and a transmission component 1310.

The bundling component 1306 may be configured to perform a calculation associated with a bundling operation. Bundling component 1306 may be configured to send a signal associated with the calculation and/or bundling operation to determination component 1308. Determination component 1308 may be configured to determine timing based on the TTI with the shortened timing and the calculation associated with the bundling operation. Determination component 1308 may be configured to send a signal associated with the timing to the transmission component 1310. Transmission component 1310 may be configured to increase a maximum number of HARQ transmissions for a transport block based on the TTI with the shortened timing and the bundling operation. For example, transmission component 1310 may be configured to send the same data transmission in consecutive TTIs (e.g., four consecutive TTIs) to base station 1350. If the base station 1350 is able to decode the data transmission using one or more of the data transmissions from the consecutive TTIs, base station 1350 may send an ACK to the reception component 1304. Reception component 1304 may send a signal associated with the ACK to the transmission component 1310 and/or a HARQ buffer component (not illustrated in FIG. 13) so that the data transmission may be cleared. If the data transmission in consecutive TTIs is not decodable by the base station 1350, a retransmission request may be sent to the reception component 1304. Reception component 1304 may be configured to send a signal associated with the retransmission request to the transmission component 1310 or a HARQ buffer component (not illustrated in FIG. 13) so that the data transmission may be retransmitted.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
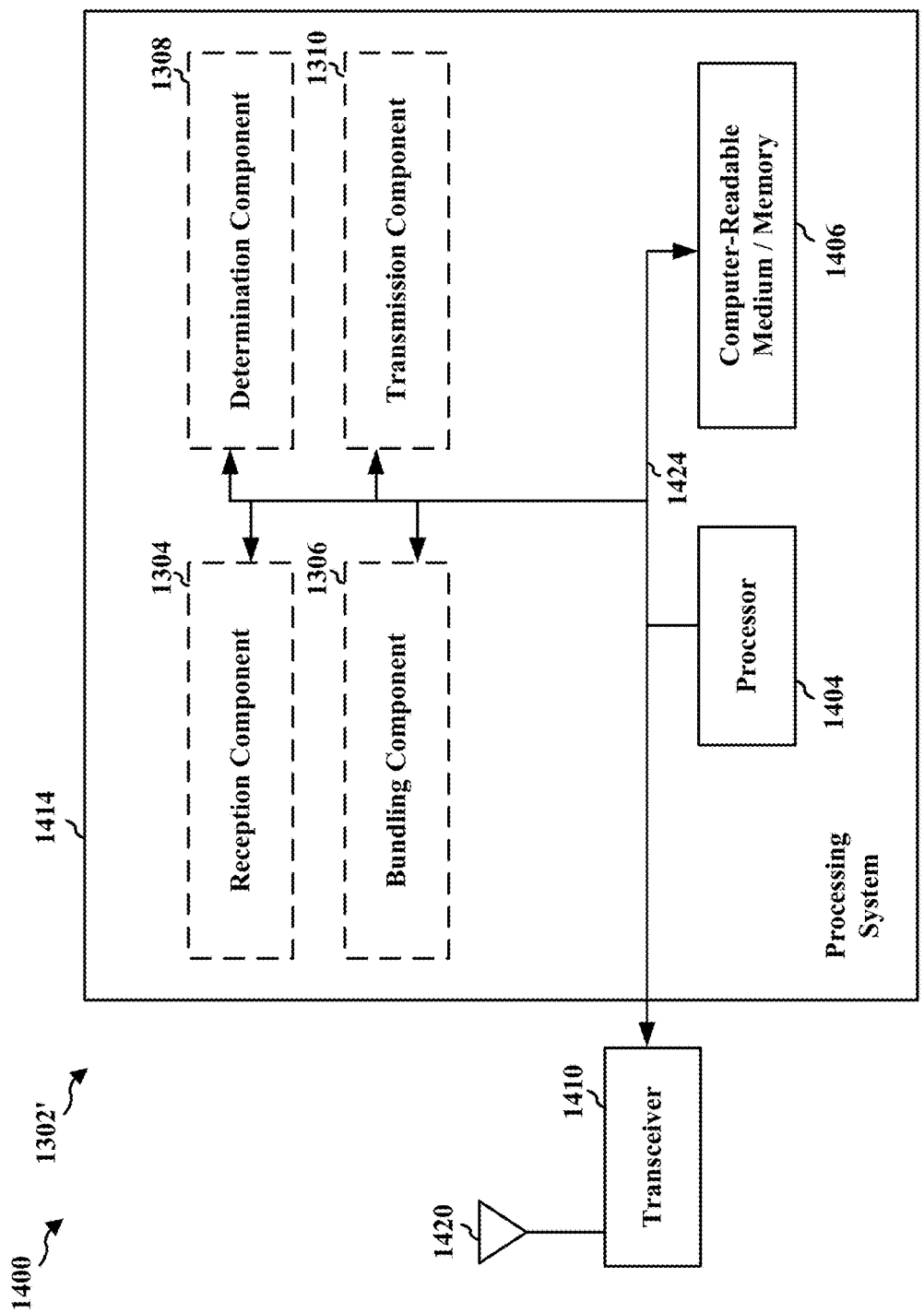
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication may include means for performing a calculation associated with a bundling operation. In another configuration, the apparatus 1302/1302' for wireless communication may include means for determining timing based on the TTI with the shortened timing and the calculation associated with the bundling operation. In an additional configuration, the apparatus 1302/1302' for wireless communication may include means for increasing a maximum number of HARQ transmissions for a transport block based on the TTI with the shortened timing and the bundling operation. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication, comprising:
   allocating a first number of hybrid automatic repeat request (HARQ) identifications (IDs) to a first portion of a buffer, the first number of HARQ IDs being associated with HARQ operation for first transmission time intervals (TTIs);
   allocating a second number of HARQ IDs to a second portion of the buffer, the second number of HARQ IDs being associated with HARQ operation for second TTIs, the second TTIs being a different size than the first TTIs, wherein the first portion and the second portion do not change a total buffer size, and wherein at least one of the first number of HARQ IDs or the second number of HARQ IDs is a shared HARQ ID that is shared between the HARQ operation for the first TTIs and the HARQ operation for the second TTIs;
   receiving a data transmission in a first TTI associated with the shared HARQ ID allocated to the first portion of the buffer; and
   receiving a retransmission of the data transmission in a second TTI, the retransmission associated with the shared HARQ ID allocated to the second portion of the buffer.

2. The method of claim 1, wherein the second TTI is shorter than the first TTI.

3. The method of claim 2, wherein:
   the first TTI is a one millisecond (ms) TTI; and
   the second TTI is a two symbol based TTI or a slot based TTI.

4. The method of claim 1, wherein the first number of HARQ IDs and the second number of HARQ IDs are shared between the HARQ operation for the first TTIs and the HARQ operation for the second TTIs.

5. The method of claim 1, further comprising:
   monitoring at least one of a first channel or a second channel for a transmission grant, the transmission grant including information related to at least one of the first number of HARQ IDs or the second number of HARQ IDs, a first transmission grant being received in downlink control information (DCI) in the first channel, and a second transmission grant being received in shortened DCI (sDCI) in the second channel or a shortened physical downlink control channel (sPDCCH).

6. The method of claim 5, wherein the receiving further comprises:
   receiving a HARQ response using a third TTI when the transmission grant is received via the first channel; or
   receiving the HARQ response using a fourth TTI when the transmission grant is received via the second channel.

7. The method of claim 5, wherein the first channel is a physical downlink control channel (PDCCH) and the second channel is the PDCCH or a shortened physical downlink control channel (sPDCCH).

8. The method of claim 1, wherein a total number of the second number of HARQ IDs is greater than or equal to a total number of the first number of HARQ IDs.

9. The method of claim 1, wherein at least one of the first number of HARQ IDs and the second number of HARQ IDs is not shared between the HARQ operation for the first TTIs and the HARQ operation for the second TTIs.

10. The method of claim 1, further comprising:
    maintaining first information associated with the data transmission in the first portion of the buffer associated with the shared HARQ ID; and maintaining second information associated with the retransmission in the second portion of the buffer associated with the shared HARQ ID.

11. The method of claim 10, further comprising:
combining the first information associated with the data transmission and the second information associated with the retransmission to perform error correction.

12. An apparatus for wireless communication, comprising:
a memory; and
at least one processor coupled to the memory and configured to:
allocate a first number of hybrid automatic repeat request (HARQ) identifications (IDs) to a first portion of a buffer, the first number of HARQ IDs being associated with HARQ operation for first transmission time intervals (TTIs);
allocate a second number of HARQ IDs to a second portion of the buffer, the second number of HARQ IDs being associated with HARQ operation for second TTIs, the second TTIs being a different size than the first TTIs, wherein the first portion and the second portion do not change a total buffer size, and wherein at least one of the first number of HARQ IDs or the second number of HARQ IDs is a shared HARQ ID that is shared between the HARQ operation for the first TTIs and the HARQ operation for the second TTIs;
receive a data transmission in a first TTI associated with the shared HARQ ID allocated to the first portion of the buffer; and
receive a retransmission of the data transmission in a second TTI, the retransmission associated with the shared HARQ ID allocated to the second portion of the buffer.

13. The apparatus of claim 12, wherein the second TTI is shorter than the first TTI.

14. The apparatus of claim 13, wherein;
the first TTI is a one millisecond (ms) TTI; and
the second TTI is a two symbol based TTI or a slot based TTI.

15. The apparatus of claim 12, wherein the first number of HARQ IDs and the second number of HARQ IDs are shared between the HARQ operation for the first TTIs and the HARQ operation for the second TTIs.

16. The apparatus of claim 12, wherein the at least one processor is further configured to:
monitor at least one of a first channel or a second channel for a transmission grant, the transmission grant including information related to at least one of the first number of HARQ IDs or the second number of HARQ IDs, a first transmission grant being received in downlink control information (DCI) in the first channel, and a second transmission grant being received in shortened DCI (sDCI) in the second channel or a shortened physical downlink control channel (sPDCCH).

17. The apparatus of claim 16, wherein the at least one processor is configured to receive a HARQ response by:
receiving the HARQ response using a third TTI when the transmission grant is received via the first channel; or
receiving the HARQ response using a fourth TTI when the transmission grant is received via the second channel.

18. The apparatus of claim 16, wherein the first channel is a physical downlink control channel (PDCCH) and the second channel is the PDCCH or a shortened physical downlink control channel (sPDCCH).

19. The apparatus of claim 12, wherein a total number of the second number of HARQ IDs is greater than or equal to a total number of the first number of HARQ IDs.

20. The apparatus of claim 12, wherein at least one of the first number of HARQ IDs and the second number of HARQ IDs is not shared between the HARQ operation for the first TTIs and the HARQ operation for the second TTIs.

21. The apparatus of claim 12, wherein the at least one processor is further configured to:
maintain first information associated with the data transmission in the first portion of the buffer associated with the shared HARQ ID; and
maintain second information associated with the retransmission in the second portion of the buffer associated with the shared HARQ ID.

22. The apparatus of claim 21, wherein the at least one processor is further configured to:
combine the first information associated with the data transmission and the second information associated with the retransmission to perform error correction.

* * * * *